US011909627B2

(12) United States Patent
Akhavain Mohammadi

(10) Patent No.: US 11,909,627 B2
(45) Date of Patent: Feb. 20, 2024

(54) METHOD AND APPARATUS FOR MANAGING NETWORK STATUS INFORMATION USING MULTIPLE DEGREE OF PRECISION GRAPH

(71) Applicant: Mehdi Arashmid Akhavain Mohammadi, Ottawa (CA)

(72) Inventor: Mehdi Arashmid Akhavain Mohammadi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/140,668

(22) Filed: Jan. 4, 2021

(65) Prior Publication Data

US 2022/0217074 A1   Jul. 7, 2022

(51) Int. Cl.
*H04L 45/12* (2022.01)
*H04L 45/00* (2022.01)
*H04L 45/48* (2022.01)
*H04L 45/02* (2022.01)

(52) U.S. Cl.
CPC ............ *H04L 45/123* (2013.01); *H04L 45/02* (2013.01); *H04L 45/14* (2013.01); *H04L 45/48* (2013.01)

(58) Field of Classification Search
CPC ....... H04L 45/123; H04L 45/02; H04L 45/14; H04L 45/48
USPC ......................................................... 709/238
See application file for complete search history.

(56) References Cited

U.S. PATENT DOCUMENTS

| 5,930,348 | A  | 7/1999  | Regnier et al. |
| 6,147,980 | A  | 11/2000 | Yee et al. |
| 6,208,295 | B1 | 3/2001  | Dogan |
| 6,804,199 | B1 | 10/2004 | Kelly et al. |
| 6,816,460 | B1 | 11/2004 | Ahmed et al. |
| 7,613,121 | B2 | 11/2009 | Chou |

(Continued)

FOREIGN PATENT DOCUMENTS

| CN | 1681257 A   | 10/2005 |
| CN | 101119372 A | 2/2008 |

(Continued)

OTHER PUBLICATIONS

Ericsson Latency analysis of SCell BFR solutions 3GPPTSG-RAN JVGI Meeting #97, R1-1907438 May 17, 2019 (May 17, 2019), 4 pages.

(Continued)

*Primary Examiner* — Hermon Asres

(57) ABSTRACT

A method and apparatus for routing packets in a network, such as a satellite mesh network. Network nodes maintain network status information (e.g. link availability information) for the entire network. However, the information is maintained to a higher level of precision for some network regions than for others. For example, the network node can be informed of network events in some regions with lower latency than in other regions. Routing information is generated based on the network status information. Multiple different mechanisms can be used to provide network status updates at different levels of precisions. Nodes which generate or relay network status updates can inhibit (e.g. block or delay) passing the updates toward a target node in order to reduce the level of precision of network status information at that target node.

23 Claims, 16 Drawing Sheets

(56) References Cited

U.S. PATENT DOCUMENTS

| | | | |
|---|---|---|---|
| 7,945,272 B2 | 5/2011 | Kim | |
| 10,796,251 B2 | 10/2020 | Frederick et al. | |
| 2003/0093514 A1* | 5/2003 | Valdes | H04L 63/1416 709/224 |
| 2004/0028060 A1* | 2/2004 | Kang | H04W 40/248 370/410 |
| 2005/0152333 A1 | 7/2005 | Smith | |
| 2005/0198286 A1 | 9/2005 | Xu | |
| 2006/0218225 A1 | 9/2006 | Hee Voon et al. | |
| 2007/0147254 A1 | 6/2007 | Larsson | |
| 2007/0239349 A1 | 10/2007 | Ohnishi et al. | |
| 2009/0046732 A1 | 2/2009 | Pratt, Jr. et al. | |
| 2010/0008368 A1 | 1/2010 | Karloff | |
| 2012/0014316 A1 | 1/2012 | Rahman | |
| 2012/0173527 A1 | 7/2012 | Thiesson | |
| 2012/0238235 A1 | 9/2012 | Lee | |
| 2013/0036236 A1 | 2/2013 | Morales et al. | |
| 2013/0232565 A1 | 9/2013 | O'Connor et al. | |
| 2014/0044008 A1 | 2/2014 | Skalecki et al. | |
| 2014/0126416 A1 | 5/2014 | Yu et al. | |
| 2014/0165163 A1 | 6/2014 | Salkintzis | |
| 2014/0177522 A1 | 6/2014 | Marshack | |
| 2014/0229405 A1 | 8/2014 | Govrin | |
| 2014/0278590 A1 | 9/2014 | Abbassi | |
| 2014/0379929 A1 | 12/2014 | Cicic et al. | |
| 2016/0057004 A1 | 2/2016 | Ge | |
| 2016/0323175 A1 | 11/2016 | Liu | |
| 2017/0117978 A1 | 4/2017 | Ko | |
| 2017/0239394 A1 | 8/2017 | Fromm et al. | |
| 2019/0081884 A1* | 3/2019 | Spohn | H04L 45/124 |
| 2019/0104056 A1 | 4/2019 | Poorrezaei | |
| 2019/0356498 A1 | 11/2019 | Hernandez Sanchez et al. | |
| 2020/0162335 A1 | 5/2020 | Chen et al. | |
| 2020/0382445 A1 | 12/2020 | Calmon | |
| 2021/0194808 A1 | 6/2021 | Mccormick | |
| 2021/0226879 A1* | 7/2021 | Indiresan | H04L 63/1458 |
| 2022/0026519 A1 | 1/2022 | Wu et al. | |

FOREIGN PATENT DOCUMENTS

| | | |
|---|---|---|
| CN | 102118456 A | 7/2011 |
| CN | 102752725 A | 10/2012 |
| CN | 103891352 A | 6/2014 |
| CN | 103986512 A | 8/2014 |
| CN | 104579454 A | 4/2015 |
| CN | 105657777 A | 6/2016 |
| CN | 107070798 A | 8/2017 |
| CN | 107231183 A | 10/2017 |
| CN | 107979409 A | 5/2018 |
| CN | 108353439 A | 7/2018 |
| CN | 108390713 A | 8/2018 |
| CN | 108449774 A | 8/2018 |
| CN | 108989223 A | 12/2018 |
| CN | 110505153 A | 11/2019 |
| CN | 111587580 A | 8/2020 |
| CN | 112260742 A | 1/2021 |
| EP | 1912391 A1 | 4/2008 |
| EP | 2853068 A1 | 4/2015 |
| WO | 2016069077 A1 | 5/2016 |
| WO | 2019173127 A1 | 9/2019 |
| WO | 2020113214 A1 | 6/2020 |
| WO | 2020193445 A1 | 10/2020 |

OTHER PUBLICATIONS

Edoardo Benzi et al "Optical Inter-Satellite Communication: the Alphasat and Sentinel-1A in-orbit experience"; SpaceOps Conferences, May 16-20, 2016, Daejeon, Korea; 14th International Conference on Space Operations.

Hemani Kaushal et al "Optical Communication in Space: Challenges and Mitigation Techniques"; Citation information: DOI 10.1109/COMST.2016.2603518, IEEE Communications Surveys & Tutorials.

M. Gregory et al "TESAT laser communication terminal performance results on 5.6Gbit coherent inter satellite and satellite to ground links"; International Conference on Space Optics—ICSO 2010, Rhodes Island, Greece, Oct. 4-8, 2010.

Zengyin Yang et al "Modeling and Routing for Predictable Dynamic Networks"; arXiv.org > cs > arXiv:1704.00885; Aug. 17, 2018.

"Iridium NEXT: A Global Effort to Launch the Future of Global Communications"; Apr. 19, 2013 | Featured Stories, Iridium NEXT.

Hueseyin Uzunalioglu et al "A routing algorithm for connectionoriented Low Earth Orbit (LEO) satellite networks with dynamic connectivity"; Published 2000 • Computer Science • Wireless Networks.

Fargnoli, Joseph D. (2016), Technical Narrative, Theia Holdings A, Inc. (Theia Satellite Network), 1455 Pennsylvania Ave. , Ste. 600, Washington, D.C., District of Columbia, United States.

"Geographic Routing"; Wikipedia, Nov. 20, 2019; https://en.wikipedia.org/wiki/Geographic_routing.

"Chapter 6 Geometric Routing" Mobile Computing Winter 2005 / 2006; https://disco.ethz.ch/courses/ws0506/mobicomp/lecture/6/Chapter6GeometricRouting4Slides_v2.pdf.

"Haversine Formula", Wikipedia, Aug. 7, 2019; https://en.wikipedia.org/wiki/Haversine_formula.

Sahhaf et al. Scalable and energy-efficient Optical Tree-based Greedy Router, 2013 15th International Conference on Transparent Optical Networks (ICTON) , Sep. 19, 2013, 5 pages.

Mccormick, William Carson et al. U.S. Appl. No. 16/721,171, filed Dec. 19, 2019.

Halabian, Hassan et al. U.S. Appl. No. 16/888,023, filed May 29, 2020.

Ashwood-Smith, Peter et al. U.S. Appl. No. 16/887,675, filed May 29, 2020.

Mccormick, William Carson U.S. Appl. No. 16/882,952, filed May 26, 2020.

Akhavain Mohammadi, Mehdi Arashmid, U.S. Appl. No. 17/167,540, filed Feb. 4, 2021.

Akhavain Mohammadi, Mehdi Arashmid et al. U.S. Appl. No. 17/141,824, filed Jan. 5, 2021.

Akhavain Mohammadi, Mehdi Arashmid U.S. Appl. No. 17/117,333, filed Dec. 10, 2020.

\* cited by examiner

METHOD AND APPARATUS FOR MANAGING NETWORK STATUS INFORMATION USING MULTIPLE DEGREE OF PRECISION GRAPH

CROSS-REFERENCE TO RELATED APPLICATIONS

This is the first application filed for the present invention.

FIELD OF THE INVENTION

The present invention pertains to packet-based data networks, such as optical satellite mesh networks, and in particular to a method and apparatus for managing network status information, for supporting packet forwarding and routing in such networks.

BACKGROUND

Low earth orbit (LEO) satellite constellations are being developed to provide, among other things, Internet routing services. It is currently proposed that a group of satellites would be distributed in space and organized into a mesh network. Free space optical (i.e. laser) links are proposed as one way for providing high-bandwidth network connectivity between satellites. Other types of links, such as radiofrequency or microwave-based links are also possible. Use of LEO satellite systems generally leads to lower latency than medium earth orbit or geostationary orbit systems, but requires large numbers of satellites.

Data packets can be routed through a satellite mesh network along a variety of paths. Because the satellites are moving rapidly with respect to the surface of the earth, routing of packets toward an earth-based destination requires consideration of satellite locations and proximity to the destination location. Rapidly computing effective routing paths in such scenarios is computationally intensive and current routing methods are subject to improvement and customization to satellite mesh networking.

More generally, mobile ad-hoc networks involving rapidly or frequently moving network nodes can be created in which peer-to-peer network connections are subject to significant and rapid change over time. The nodes can be associated, for example, with cars, portable mobile base stations, balloons, drones, satellites, or a combination thereof. The network movement may extend across large geographical areas. Such networks can be referred to as having hyper dynamic network topologies. In such networks, it is challenging to maintain awareness of the current and future available network connections, in the form of network status information which may be maintained in a database. Such network status information can include link state information and is useful for supporting packet routing and forwarding. Even if network connections can be predicted, propagating notifications of network events such as link failures can be costly in terms of resource usage, and can be difficult to perform in a timely manner.

Therefore, there is a need for a method and apparatus for managing network status information in satellite mesh networks and similar networks that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for managing network status information (e.g. link state information or a link state database for supporting packet forwarding and routing), for example in satellite networks or other types of networks. Network nodes maintain information indicative of network status over the entire network (or at least a relatively large portion of the entire network). However, the network status information for some portions of the network is maintained to a more precise degree than the network status information for other portions of the network. Precision can correspond for example to the latency between occurrence of a network event (such as a link failure) and a node becoming informed of this network event. For example, where a node has more precise information of network status, this latency can be lower than where the node has less precise information of network status. Latency (or other factors affecting precision) can be purposefully lowered by actively inhibiting (e.g. blocking or delaying) propagation of network status updates to certain nodes.

In some embodiments, network nodes can explicitly maintain different levels of precision of network status information for different network zones. These network nodes can combine the network status information for the different zones for routing purposes. In some embodiments, network nodes generating or propagating network status information can inhibit (e.g. delay, block or send via a different method) certain network status updates from being communicated toward certain other network nodes.

In accordance with embodiments of the present invention, there is provided a method for managing a link state database in a network. The method is performed by a network node. The method includes maintaining network status information for a plurality of different portions of the network. The network status information for one of the different portions is updated with a higher latency than said network status information for another one of the different portions. The higher latency is due at least in part to active inhibition of notifications indicative of the network status information by one or more other network nodes. The method includes updating the link state database based on the network status information for the plurality of different portions of the network. The link state database is indicative of link states within the plurality of different portions of the network. The link state database may include multiple portions each having a different respectively level of precision. For example the link state database may include a first portion indicative of link states for said one of the different portions of the network, and a second portion indicative of link states for said other one of the different portions of the network. The link state database may include an indication that different portions are tracked with different levels of precision due to different latencies of network status information updates. For example, the indication may include that the first portion is tracked with a lower precision than the second portion due to said higher latency.

In accordance with embodiments of the present invention there is provided a method for managing information in a packet in a network. The method is performed by a network node. The method includes generating or receiving an indication of a network event. The method further includes transmitting the indication of the network event toward a first one or more other network nodes. The method further includes inhibiting transmission of the indication of the network event toward a second one or more other network nodes.

In accordance with embodiments of the present invention there is provided a network node having a network interface, a processor and a non-transitory memory. The network node is configured to maintain, using the processor and the memory, network status information for a plurality of different portions of the network. The network status information for one of the different portions is updated with a higher latency than said network status information for another one of the different portions. The higher latency is due at least in part to active inhibition of notifications indicative of the network status information by one or more other network nodes. The network node is further configured to update the link state database based on the network status information for the plurality of different portions of the network, the link state database indicative of link states within the plurality of different portions of the network.

In accordance with embodiments of the present invention there is provided a network node comprising a network interface and a processor. The network node is configured to receive, via the network interface, an indication of a network event, or generate the indication of the network event. The network node is configured to transmit, using the network interface, the indication of the network event toward a first one or more other network nodes. The network node is configured to inhibit transmission of the indication of the network event toward a second one or more other network nodes.

In accordance with embodiments of the present invention there is provided a system comprising plural communicatively coupled network nodes. The system includes at least a first network node and a second network node. The first network node is configured to: receive or generate an indication of a network event; transmit, using the network interface, the indication of the network event toward a first one or more other network nodes; and inhibit transmission of the indication of the network event toward a second one or more other network nodes. The second network node is configured to: receive the indication of the network event from the first network node, or via another path or mechanism not involving the first network node, upon the first network node inhibiting transmission of the indication of the network event; and maintain, based at least in part on the indication of the network event, network status information for a plurality of different portions of the network.

The trees can be loop free path trees. The trees can be shortest path trees in some embodiments. Alternatively, when there are routing constraints or other traffic engineering considerations, the trees can define paths which are not necessarily the shortest paths. Rather they may define paths which are sufficient or optimal given current constraints. The routing trees can define "lowest cost" or "highest utility" paths with respect to some cost or utility function. The routing trees can similarly define "sufficiently low cost" or "sufficiently high utility" paths. For example, the routing tree can have a cost which is lower than a threshold, or the lowest among a subset of candidates. However, for the sake of simplicity, the present disclosure is written primarily from the perspective that shortest path trees are determined. It should be understood that the term "shortest path tree" can be replaced herein with the term "tree having sufficient path performance," to reflect the fact that the tree can define routes which are shortest path, lowest cost, highest utility, sufficiently low cost, sufficiently high utility, etc. The cost or utility can be constrained or unconstrained.

A potential benefit of the present invention is that network status update messaging is used more efficiently by limiting how far more frequent updates are spread in the network. For example, for a given flood frequency, a more accurate network view may be possible. This allows the number of global floods indicating network status updates to be reduces, and may reduce or prevent link state message storms. Additionally, less frequent updates for non-local regions of a routing table may tend to make the routing table more stable, and reduce the need for running frequent Dijkstra or other path computations over a large size routing table. This can also potentially reduce power consumption and computation requirements.

Another potential benefit is that nodes are able to route packets using a global view of the network while using limited overhead. This is achieved by causing the global view of the network to consist of regions with various degree of accuracy.

Another potential benefit is that precision and accuracy of routing is maintained, because nodes which have more precise network topology information at the local level can perform course corrections as necessary.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
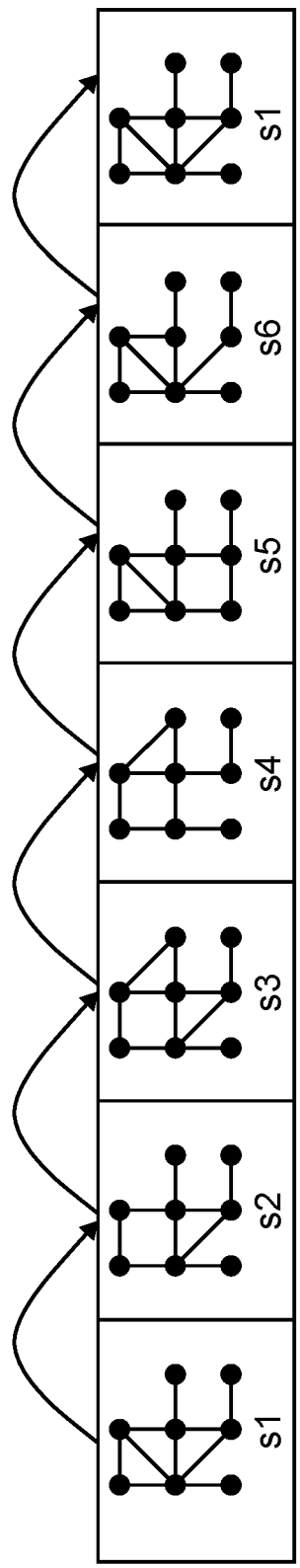
FIG. 1 illustrates a graph of a dynamic network which periodically cycles through a plurality of connectivity states, according to an embodiment of the present invention.

As used herein, the term "about" should be read as including variation from the nominal value, for example, a +/−10% variation from the nominal value. It is to be understood that such a variation is always included in a given value provided herein, whether or not it is specifically referred to.

Satellite-based networks potentially provide global connectivity and may also provide new coverage extensions in Fifth Generation (5G) communications technologies, as defined for example by the $3^{rd}$ Generation Partnership Project (3GPP). Overall industry interest is to deploy inter-satellite links to route user traffic over multiple satellites. In this regard, use of low earth orbits (LEO) satellite systems may be appropriate, as such systems have lower round trip latency and lower launch costs compared to Medium earth orbit (MEO) and Geostationary earth orbit (GEO) systems. However, an effective global network requires potentially large numbers of LEO satellites. On the other hand, the dynamic nature of satellite network constellations presents challenges for existing routing protocols due for example to the existence of an orbital seam e.g. in a polar constellation, or between multiple seams in a Walker Delta constellations, the size of network, and the requirement to timely communicate network changes to all nodes as they occur.

While GEO satellites are stationary to the side of the earth they are facing, MEO and LEO satellites are considered to be mobile with some time periodicity. That is, they meet the same point of the earth after a specific time period which is dependent on their altitude. GEO satellites are located at 22,236 miles (35,786 kilometers) above Earth's equator. Due to high altitude of these satellites and long the round trip delay, GEO satellites are not a proper option for broadband, low delay data networks. LEO satellites however, provide global coverage over the earth and are capable of reusing frequency more effectively. LEO satellite networks can provide ubiquitous connectivity with low latency. A characteristic of these satellite networks is that many satellites are typically needed to provide global coverage, mainly due to the low altitude of the individual satellites.

In satellite communication technologies, a satellite constellation is defined as a group of satellites with coordinated ground coverage and shared control rotating in LEO orbits. Two main satellite constellations are "polar constellation" and "walker delta constellation". Walker delta constellations are thought to provide better uniform coverage over the earth almost everywhere except poles, where no coverage is provided. Polar constellations however provide a dense coverage over the poles and less dense coverage over the equator.

Satellite network nodes may have two types of interfaces: Ground communication interfaces, and Inter-satellite link (ISL) communication interfaces. The ground communication interfaces can be microwave systems operating in X-band or ka-band. The ISL interfaces can use communication lasers and can provide for high-speed optical free-space communication links between the satellite nodes. ISL links include intra-orbit links, i.e. links between (typically adjacent) satellites in a common orbit but spaced apart, and inter-orbit links, i.e. links between satellites in different (typically adjacent) orbits.

Due to the dynamic nature of the satellite networks, the ISL characteristics also change dynamically. Even for ISLs where link distance is constant, the link behavior may change as the satellites pass over different parts of the earth (e.g. at the poles). The dynamic range of characteristics for the ISLs is significantly larger for inter-orbit ISLs for both polar and walker delta constellations. Due to the dynamically changing ISL links, attributes the network topology in satellite networks is considered to change dynamically. The impact of network topology changes, link failures and link creations, link level optical impairments as well as Doppler Effect makes packet routing a significant challenge in satellite data networks. This is particularly the case in dense LEO satellite networks where network events are frequent. Packet addressing is another challenge. Additionally, satellite onboard processing capability is limited and therefore it is desirable to limit the amount of onboard processing that is required to perform functions such as network routing.

One issue in satellite networks relates to flooding behavior and integration with ground segments of the network. Internet protocol (IP) based routing does not scale well with very large flat satellite networks requiring minimum delay (distance) routing. This is due to the fact that the satellite network topology is dynamic and minimum distance paths change over time.

Link failures occur frequently in large scale massive satellite networks. In single-hop geographical routing with link failures, alternate path routing may take packets farther from their destination. This tends to lead to failure of single-hop geographical routing. This problem arises due to the fact that the entire region of the network may not be visible to each node. Since performing network status updates (e.g. via flooding) is time consuming, network convergence is relatively slow. When network status changes are frequent, this can result in network information at each node failing to adequately track the actual network state.

When using a LEO satellite mesh network to route a packet to a ground-based destination, it is notable that the satellite constellation typically moves rapidly relative to the destination. This makes it challenging to determine, at a given time, which path to forward the packet on so that it efficiently reaches the destination. For example, it may be desirable to determine which target satellite is currently closest (or adequately close) to the ground destination so that the packet can be routed along a path toward that satellite.

Embodiments of the present invention address network routing challenges in the context of satellite networks. Specific focus is in the application to non-terrestrial massive (satellite) polar and walker-delta constellation networks in order to provide global communications services that may not be supported by terrestrial (e.g. wire line or fibre-based) networks. The networks are generally considered to be flat, i.e. non-hierarchical, without necessarily being separated into multiple routing areas. Various embodiments provide for a flat network routing paradigm in which each network node is only required to have limited knowledge of network conditions, for at least some portions of the network. This limits the requirement to propagate network condition updates (e.g. via flooding link status update messages) through the network. In particular, in various embodiments, network status updates are precisely (e.g. with low latency) communicated locally within a limited network region, and network status updates for other network regions are communicated with lesser precision (e.g. higher latency). It is noted that embodiments of the present invention are not necessarily limited to satellite networks. Embodiments can be applied to fixed or mobile terrestrial networks, or combination terrestrial and satellite networks.

By considering flat networks which are not separated into multiple routing areas, embodiments of the present invention allow for a relatively simple networking paradigm that considers a single routing area. This can be particularly important when implementing networks in which nodes are highly mobile, for example in the case of satellite networks. In such cases, implementing multiple routing areas would be problematic due to node mobility.

Furthermore, in large flat networks, embodiments of the present invention tend to inhibit network status update messages and limit propagation of such messages. This limits communication overhead and also limits computation overhead that would be triggered by a network node receiving a network status update message and having to re-perform its shortest path routing computations, for example involving Dijkstra's algorithm. Yet further, in some embodiments, network nodes may be configured to perform Dijkstra computations on limited portions of a network at a time, for example in response to receiving a network status update message related to that portion. Dijkstra computations for different portions of the network can be performed at different times, for example in response to receiving different network status update messages related to different portions of the network. The network status update messages for different portions can be received at different rates in time, and thus can represent different levels of precision. By limiting network status update messages, overhead corresponding to communicating the messages and responding to the messages is reduced, and the network is potentially more stable.

Additionally or alternatively, flat networks can correspond to networks in which each node can access information for each other node in the network. That is, network topology abstraction is not used to represent groups of nodes as a single "virtual node." Each node that is routable from a given node is visible to the given node, and the node can determine a shortest path tree to each other node in the network. The shortest path tree expands outward from a given node, with the furthest nodes (e.g. in terms of hops) being at the bottom of the tree.

In networks involving mobile nodes, such as LEO satellite nodes, the relative motion of satellites with respect to each other, ground nodes, or both, can result in time-varying network topology and link availability. Maintaining routing tables and network status (e.g. link state) information globally therefore becomes a challenging task. It is therefore useful to consider alternative methods, which can be implemented using limited information. The limited information may include node location and link state information for only those nodes in a local neighbourhood of a given node making a routing decision. For example, according to embodiments of the present invention, each network node maintains highly precise node location and link status information for a limited portion of the network that is local to that network node. Information for other portions of the network can be less precise, for example by updating such information less frequently. The network in such cases can be a flat network, namely without area border routers, network hierarchies, network abstractions, local networks separated from interconnecting networks, etc. That is, the network may consist essentially of network nodes which are interconnected but without imposed multi-level structure or organization.

Embodiments of the present invention provide for a method, apparatus and system for managing network status information, for example for use in supporting packet routing in a network. The network may be a hyper dynamic network, for example. Packet routing support can include packet routing, or at least maintaining of network status information that can be used for routing support. Packet routing includes determining a path through the network which the packet is to be forwarded along, and transmitting the packet to a node along that path, for example by forwarding it to the next hop node along the path.

FIG. 1 illustrates a graph of a dynamic network which periodically cycles through a plurality of connectivity states s1, s2, s3, s4, s5 and s6. The nodes of the network can be satellite nodes, for example, and the edges connecting the nodes are node-to-node communication links. Networks topologies do not necessarily change in a periodic or predictable manner, however for purpose of illustration, the network of FIG. 1 is considered to cycle through states s1 to s6 repeatedly. Even with such a predictable network topology progression, node or link failures may occur. Notifications of such failures should be communicated to other nodes in the network, so that the other nodes do not attempt to route a packet over a failed link or via a failed node.

Network Status Information

The network status information can include, for example, one or more network topology graphs, a link state database, traffic engineering information (e.g. amount of available bandwidth for one or more links, link delay, latency, jitter, etc.) or related or equivalent information. Network nodes can maintain a global view of the network topology graph and the link state database. In various embodiments, a link state database can be maintained and updated based on current network status information. The view is global in the sense that the network node maintains such information for all parts of the network, or at least all parts of the network to which the node may be required to forward a packet. Generally, the network status information can include information indicative of available nodes of the network and available links between nodes of the network. The network status information can include logical (network) node locations, physical node locations, or a combination thereof. The network status information is maintained for a plurality of different portions of the network, such that network status information for different portions may be maintained to different levels of precision. The portions of the network can be defined in a node-specific manner, so that a particular node defines its network portions in a certain way, which is not necessarily the same way that one or more other nodes defines its network portions. Different portions of the network may be overlapping, non-overlapping, or a combination thereof.

As mentioned above, the network status information for different portions of the network can have different levels of precision. For example, network status information for one portion of the network can have a lower level of precision than network status information for another portion of the network. The level of precision can correspond at least in part to a latency (time delay) between occurrence of a network event and the network node being notified of the network event. Higher latency in this case corresponds to lower precision. Precision for a given portion can correspond to the speed by which network events such as link state and topology updates are delivered to a node for that specific zone. Precision thus corresponds to a network node's sensitivity to network events in a given network portion.

The link state database may include multiple portions each with its own indicated level of precision. Information derived from the link state database, such as network topology graphs, routing and forwarding tables, etc., may inherit its precision from these indicated levels of precision. For example a network topology graph or routing table for a particular portion of the network may have the same level of precision as that portion. Different ones of the multiple portions of the link state database may be handled and updated separately. Different network topology graphs, routing or forwarding tables, or other data may be generated for different ones of the multiple portions of the link state database, and these may be handled and updated separately also. Furthermore, data generated for a particular portion of the link state database may include an indication of the level of precision for this portion of the link state database. For example, a topology graph, routing tree or routing table generated for a certain portion of the link state database may be generated separately when this portion of the link state database is updated. This topology graph, routing tree or routing table may be integrated with other topology graphs, routing trees or routing tables for the network following such an update.

In some embodiments, routing information may reflect multiple different levels of precision of link state information, where the link state information corresponds to multiple portions of the network. For example, when the routing information is generated based on a link state database having multiple levels of precision, the routing information will inherit these levels of precision. A routing table may include different zones with different levels of precision, reflecting the different levels of precision of link state information.

Additionally or alternatively, the level of precision can correspond to the level of detail about a network event. For example, the location of a network event can be communicated to a certain level of precision, such as a certain spatial area or network region, and the level of precision of the location can correspond at least in part to the level of precision of the network status information.

Each network node's topology graph and link state database can consist of multiple portions, which may be referred to as zones, levels, or regions. Each portion can correspond to a different portion of the network as described above. In some embodiments, different portions can be defined by different radii, which are specified in terms of the number of hops or the physical distance to be traversed from the node to reach a corresponding portion. The network topology graph and link state database can be indicative of the entire network, for example to a level of precision in which each network node and each node-to-node communication link is represented in the network topology graph and link state database. This is in contrast to hierarchical implementations and network topology graphs representing a limited portion (e.g. routing area) of the entire network, with artificial boundaries between network portions.

The link state database can indicate link states for at least one, and typically a plurality of network portions. The link states can indicate whether a link is currently active or inactive. Inactive links can be due to node or link failures. In some embodiments the link states can indicate the current capacity of a link, or other parameters such as QoS, delay, jitter, error rate, etc.

Inhibiting Updates

In various embodiments, different levels of precision can be provided for at least in part by network nodes actively inhibiting (e.g. blocking or delaying) updates to network status information from reaching a target network node, at least by one notification mechanism. For example, a network node that receives a network status update message may selectively forward the update message toward some nodes, while refraining (inhibiting) from forwarding the update message toward other nodes. This has the effect of limiting the amount of communication overhead that is used to propagate the update messages, which can lead to lower network overheads. The network node can, for example, refrain from forwarding the update message toward a node that is outside of a predetermined limited message propagation region. The limited message propagation region may be defined for example based on the origin of the update message or the location of the network event being indicated by the update message. Network nodes which generate network status information can delay or inhibit notifications thereof in much the same way as described above for network nodes which receive and relay network status information. The terms "notification" and "update messages" are used interchangeably.

Active inhibiting network status update messages may be done intentionally, as part of a configuration of the network, rather than unintentionally due to inherent propagation delays in the network. That is, nodes can actively and intentionally delay or block network status updates from propagating in certain directions, for the purpose of managing how updates propagate through the network. Similarly, nodes can cause network status updates to be communicated via different means, such as via almanac updates rather than flooding messaging. It is noted that, when a network status update is blocked, the information contained therein is still expected to be propagated past the block, for example at a future time or by other (possibly slower) means.

Inhibiting transmission of a network event indication toward another network node may include delaying transmission of the indication, blocking transmission of the indication, or causing the transmission to be forwarded by an alternative mechanism. In some embodiments, when a message indicating network status traverses a certain number of hops, it is discarded, thus inhibiting further propagation of the message. The number of hops can be tracked using a time to live counter included in the message, for example.

In some embodiments, inhibiting transmission of a network event indication toward another network node may include delaying transmission of the indication after it has travelled a certain number of hops. For example, after the transmission has travelled n hops, it may be delayed for a predetermined period of time, and then transmitted (e.g.

without further delay) for another m hops. As another example, a first transmission initiated by a first node may be discarded after n hops, while a second, later transmission of the same information transmitted by the first node may be discarded after m n hops.

In some embodiments, when certain network nodes inhibit notifications, the end node which maintains network status information for plural network portions and generates corresponding routing information is not necessarily specially adapted for doing so. Rather, such end network nodes can simply update their network status when relevant information is received. In such embodiments, the invention may be facilitated primarily by the operation of the network nodes which inhibit notifications, and potentially also by the multiple notification mechanisms being used.

The limited message propagation region and the limited portion of the network for which a node maintains network status to a given level of precision are complementary. For a particular network status update message, when a target node is outside of the limited message propagation region, the origin of the network status update message (or the location of the network event) is, from the perspective of the target node, within a portion of the network for which status is maintained with a lower level of precision. This lower level of precision is such that the target node does not expect to receive network status updates via the mechanism which has been blocked by the action of refraining from forwarding the update message.

In various embodiments, different levels of precision can be provided for by using different notification mechanisms. The different notification mechanisms inform a target network node of changes to network status for different network portions, but may have different levels of precision, such as different latencies. For example, network status information can be maintained to a higher level of precision by a flooding mechanism, in which a network event triggers network status updates to be rapidly communicated among a set of network nodes. The flooding region can be limited, for example by including a time to live counter in the network status update messages. The time to live counter may then be decremented by each node which forwards the message onward, and the message can be discarded when the time to live counter reaches zero. As another example, network status information can be maintained to a lower level of precision by an almanac mechanism, in which a network management entity periodically transmits a notification of network status, for example on an hourly basis. The almanac notification can be transmitted via a different physical or logical channel than the network status update messages communicated by flooding. Inhibiting or delaying a notification can include selecting a slower notification mechanism for use in forwarding the notification. For example, when a node receives a notification via a first notification mechanism, it can actively delay further propagation of the notification by using a second, higher latency notification mechanism for transmitting the notification to subsequent nodes.

In some embodiments, when a node receives the same network status information multiple times, e.g. via multiple different notification mechanisms, it may merge the information together, or ignore the later-received versions of the information. More generally, nodes can be configured to operate in networks for which at least some network status updates are actively inhibited. Such nodes can manage network status for different network regions for which network status is expected to be less precise, and to update information for these different regions in different ways and at different times.

Figure 2:
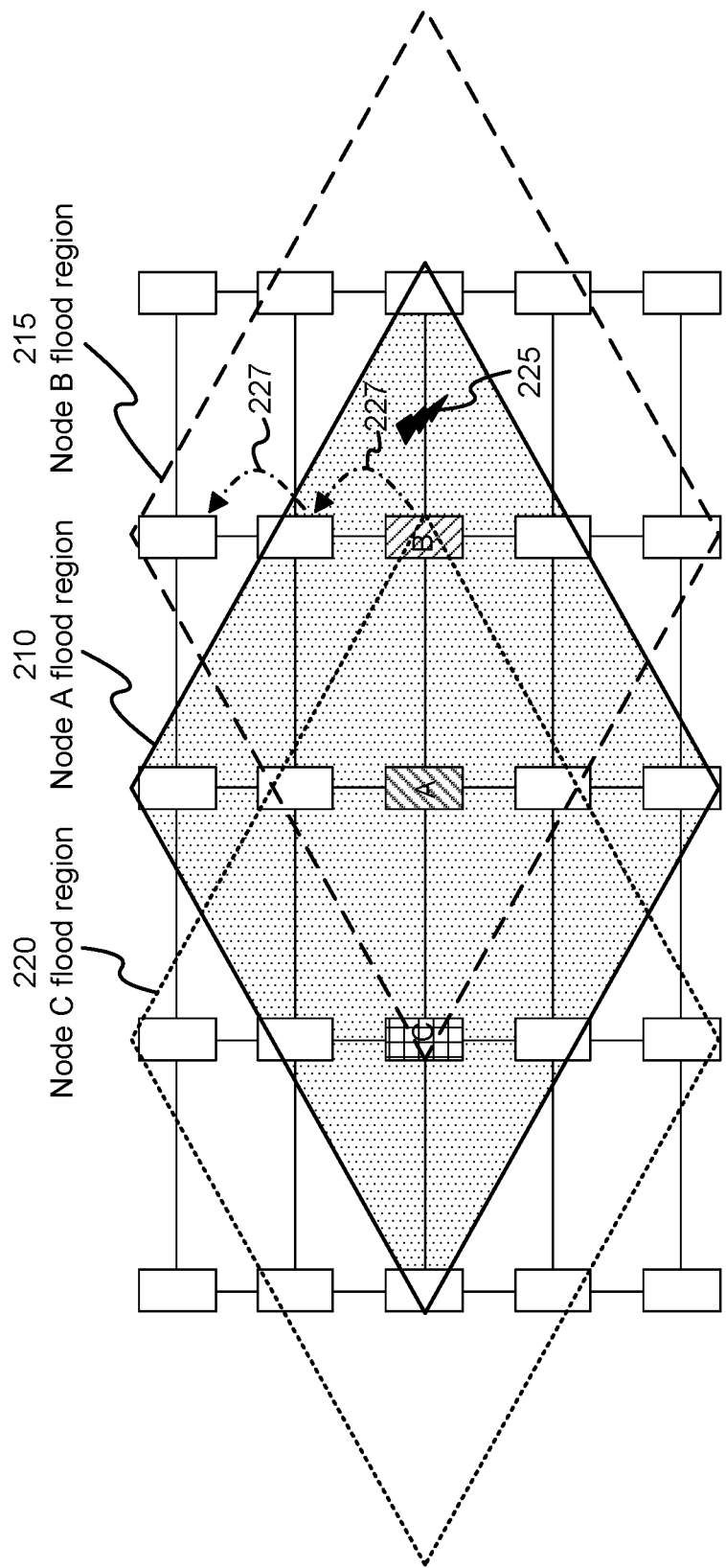
FIG. 2 illustrates an example of a limited flooding mechanism that can be employed by network nodes to disseminate network status information, according to an embodiment of the present invention.

FIG. 2 illustrates an example of a limited flooding mechanism that can be employed by network nodes to disseminate network status information according to embodiments of the present invention. The network is illustrated as a two-dimensional grid of interconnected nodes for simplicity, although arbitrary network topologies (e.g. three-dimensional topologies) can be employed. Each illustrated node A, B and C, upon detecting a network event such as a link failure, is configured to transmit network status update messages, indicative of the network event, to all nodes within two hops. Therefore, all nodes within region 210 receive network status updates originating from node A, all nodes within region 215 receive network status updates originating from node B, and all nodes within region 220 receive network status updates originating from node C. As an example, node B can detect link failure 225 and transmit network status update messages 227 indicative of the link failure 225. The network status update messages can include a time to live counter (initially set in this example to 2) which is decremented by each node which forwards the message onward. A node which decrements (or would decrement) the time to live counter to 0 delays or discards the network status update message. Such nodes are located at the peripheries of regions 210, 215, 220 for example. Delaying or discarding the network status update message inhibits the message from being forwarded to further nodes, either for a certain amount of time or permanently. In some embodiments, rather than discarding the network status update message, a node can delay forwarding of the message, or cause the message to be forwarded via another mechanism. If a network status update message is discarded, other copies of the message, for example communicated in other manners, are not necessarily discarded. In various embodiments, it is expected that the content of network status update messages will eventually reach all nodes, even if it is subject to delay and some messages including such content are discarded.

In some embodiments, a notification mechanism can involve one or more selected nodes which acquire network status information and transmit notifications of the network status information after a delay, or based on a schedule (e.g. periodically). Such selected nodes can be relatively well-connected nodes, central nodes, control nodes, etc. For example, in a satellite network, the selected nodes can be terrestrial ground stations which communicate with the satellites. Satellite nodes may then receive notifications of network status information directly from the ground stations. Additionally, some satellite nodes may receive notifications of network status information indirectly from the ground stations, by having intermediate satellite nodes relay the notifications of network status information. Ground stations or other selected nodes can then build a network topology graph or portion thereof, and transmit the network topology graph to satellites, thereby providing notifications of network status information.

Figure 3:
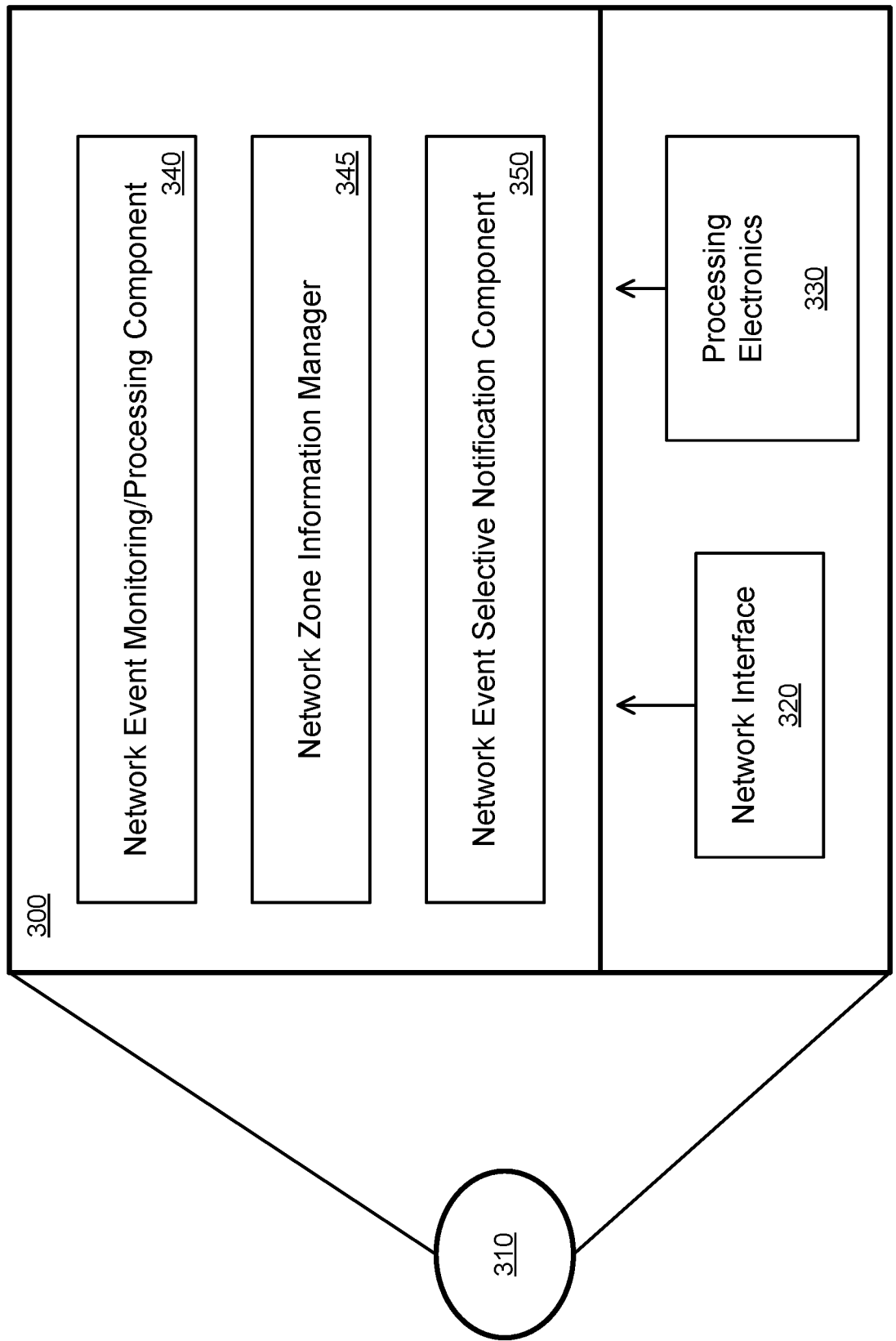
FIG. 3 illustrates an apparatus located in a network node for conveying network status information, according to an embodiment of the present invention.

FIG. 3 illustrates an apparatus 300 located in a network node 310, according to an embodiment of the present invention. This apparatus is configured in particular for conveying notifications of network status information. The apparatus 300 includes a network interface 320 and processing electronics 330. The network interface 320 can be a single network interface or a combination of network interfaces (e.g. including a satellite-to-satellite communication interface and a satellite-to-ground communication interface). The processing electronics can include components such as computer processors, memory, digital or analog circuits, or the like, or a combination thereof. The processing electronics 330 can be configured to provide the network event monitoring or processing component 340, the network zone information manager 345 and the network event selective notification component 350.

The network event monitoring or processing component 340 is configured to monitor for network events, for example by monitoring for nearby link failures, nearby node failures, or messages received via the network interface 320 and indicative of network events such as node or link failures.

The network zone information manager 345, which may be included in various embodiments and excluded in other embodiments, is configured to manage information regarding zones or regions of the network. For example, the network zone information manager 345 may maintain indications of which regions of the network the node should immediately forward network event notifications to, and which regions the node should inhibit forwarding network event notifications to. The network zone information manager may comprise a time to live counter field which defines the value to initialize a network status update message time to live field. The network zone information manager can store policies regarding how to handle network status update messages.

The network event selective notification component 350 is configured to implement the policies of the network zone information manager in response to network events identified by the network event monitoring or processing component 340. When a network event occurs, the network event selective notification component 350 may determine which nodes (if any) to forward a related notification toward, or under which conditions the notification should be inhibited. The network event selective notification component 350 can also be configured to determine which mechanism should be used to forward a network event notification toward one or more identified nodes.

In some embodiments, the network event selective notification component (or possibly the network zone information manager) may be configured to implement parameters related to the distance which network status update messages travel, for example based on physical or network distance, or a combination thereof. Network distance may be based at least in part on a hop count. Network distance may be based at least in part on a cost or utility metric such as a virtual link cost. Physical distance may be expressed in units such as meters. In some embodiments, the network zone information manager may be configured to implement delay parameters in cases where inhibiting network status update messages includes delaying said network status update messages. For example, the delay parameters may indicate how long a network node should delay a network status update message which has travelled a certain number of hops, before forwarding the network status message onward.

Figure 4:
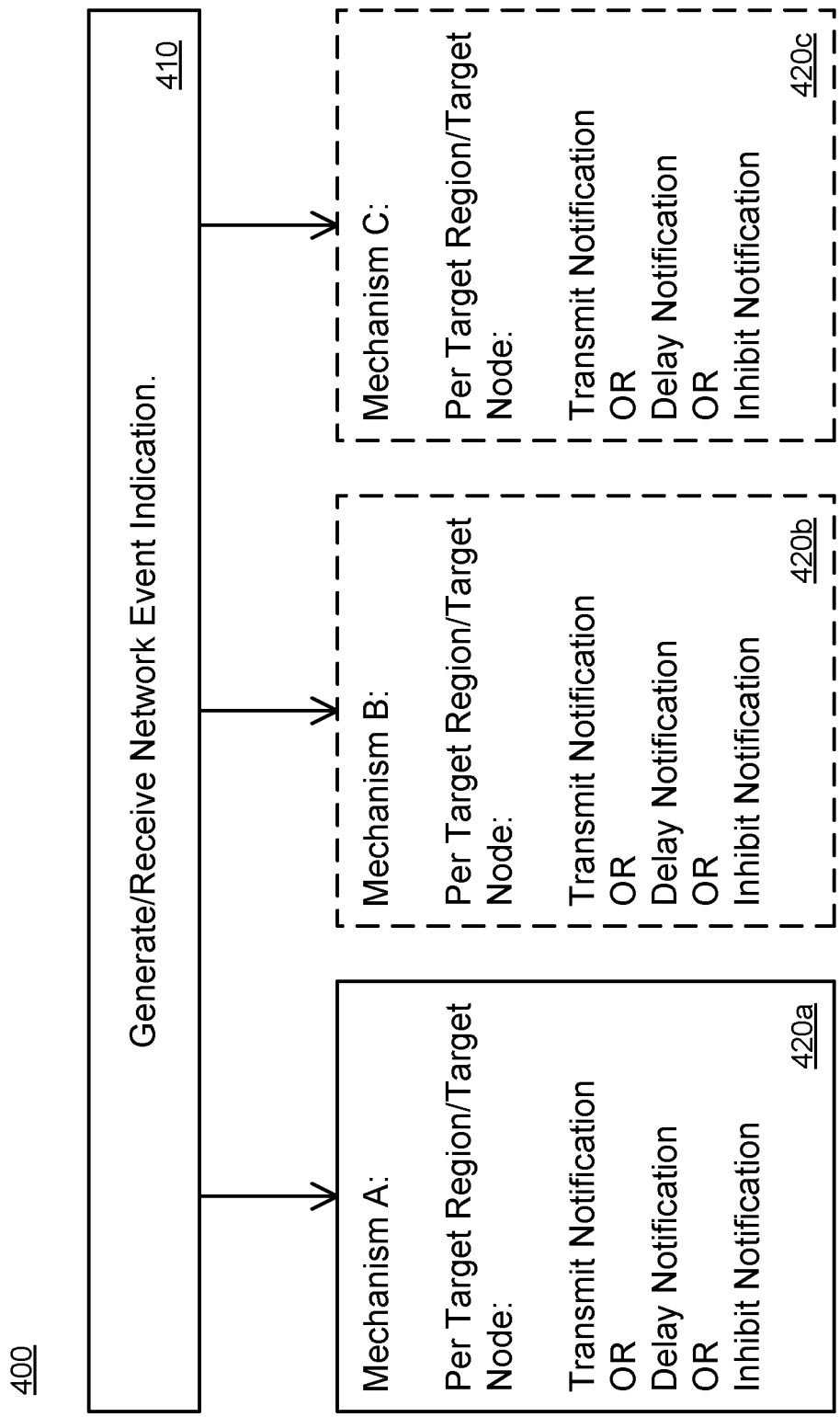
FIG. 4 illustrates an aspect of operation of the apparatus of FIG. 3, according to an embodiment of the present invention.

FIG. 4 illustrates operation 400 of the apparatus 300, according to an embodiment of the present invention. At operation 410, a network event indication is generated by the apparatus 300 based on a local network event, or is received by the apparatus from another network node. For each of a plurality of update mechanisms, at operations 420*a*, 420*b*, 420*c* respectively, the node determines whether or how to transmit the related network event notification toward a given target region or target node. This determination can be performed multiple times, each for different target regions or target nodes. The determination can include determining whether to transmit the network event notification immediately, delay the notification for a predetermined time, or inhibit transmission of the notification. The update mechanisms can include a flooding mechanism for example. The operation is performed for at least one, and possibly plural update mechanisms.

Routing Information

Various embodiments of the present invention include generating routing information based on network status information. For example, the routing information can be generated based on network status information for different portions of the network, where the network status information has different levels of precision for different such portions of the network. It should be noted that there is not necessarily a clearly defined distinction between network status information and routing information, because the network status informs routing. However, for clarity, it is considered herein that the network status information is processed to determine routing information, which is more readily usable to make packet routing decisions. For example, whereas network status information may include network topology graphs or a link state database, routing information may include a shortest path tree or routing table generated based on such network status information.

It is noted that network nodes may obtain link state information, process the link state information and generate a network status information database or link state database. The network topology graph may be generated based on information from such database(s). A shortest path tree may be generated based on the network topology graph, for example by running Dijkstra's algorithm. The shortest path tree is then formatted and used to implement the forwarding plane for the network node. Alternatively to a shortest path tree, a tree having sufficient path performance can be generated. A tree having sufficient path performance may have shortest paths, paths which are close to shortest paths, or the like. Other performance metrics other than path length can be used to evaluate path performance.

In some embodiments, the shortest path tree (or other loop free path tree) can be computed on behalf of a network node by another computing device, for example located on a ground station or supervisory network node with more computing capability than the network node. The computed tree may then be transmitted to the network node for example on a periodic (e.g. hourly) basis. This mitigates the need to run Dijkstra's algorithm for a large network in response to distant network events.

In general, the routing information can include information based on which it can be determined where to forward a particular packet based on a specified destination of the packet. The specified destination typically falls within or is reachable by a node within one of the different portions of the network. For example, the specified destination may be a network node, or a device (e.g. a terrestrial base station) that is reachable via the network node. The routing information can specify paths for a plurality of potential packet destinations, for example as in the case of a routing table.

In some embodiments, generating the routing information includes superimposing multiple network topology graphs corresponding to different portions of the network. Each network topology graph may be part of or derived from the network status information. Each network topology graph indicates available nodes of the network and available links between such available nodes. In some embodiments, generating the routing information further includes generating a shortest path tree based on the superimposed network topology graphs. The shortest path tree indicates desired routing paths through the network to reach different nodes of the network. Shortest path trees can be generated for example based on Dijkstra's algorithm.

In some embodiments, generating the routing information includes generating or obtaining multiple network topology graphs corresponding to different portions of the network. A different shortest path tree is then generated based on a corresponding one of the multiple network topology graphs. Each shortest path tree indicates desired routing paths through the network to reach different nodes of the network. Then, the multiple shortest path trees are superimposed with one another to define an overall shortest path tree for the network.

Figure 5:
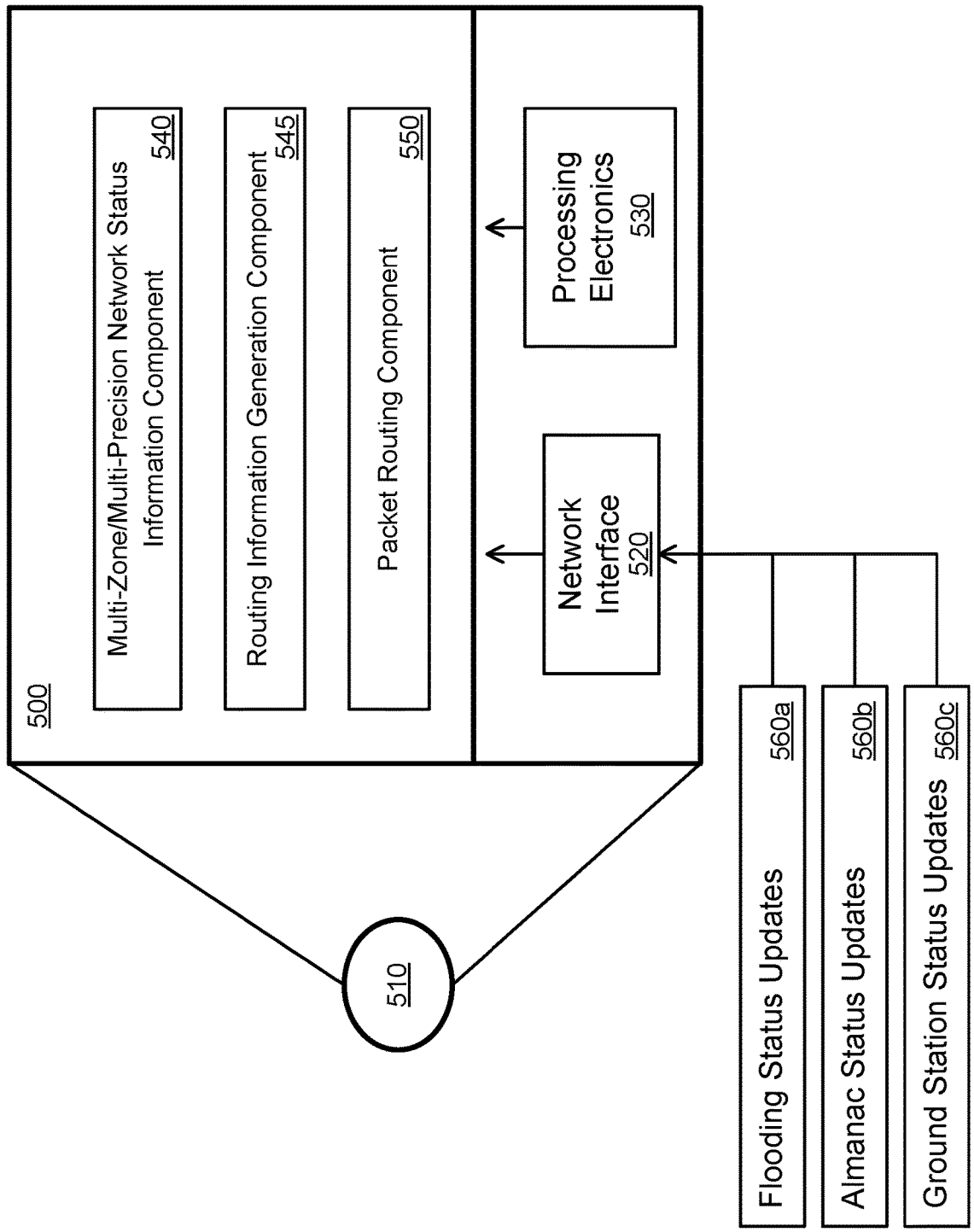
FIG. 5 illustrates an apparatus located in a network node for performing packet routing, according to an embodiment of the present invention.

FIG. 5 illustrates an apparatus 500 located in a network node 510, according to an embodiment of the present invention. The apparatus 500 is configured to perform packet routing and includes a network interface 520 and processing electronics 530. The network interface 520 can be a single network interface or a combination of network interfaces (e.g. including a satellite-to-satellite communication interface and a satellite-to-ground communication interface). The processing electronics can include components such as computer processors, memory, digital or analog circuits, or the like, or a combination thereof. The processing electronics 530 can be configured to provide the multi-zone/multi-precision network status information component 540, the routing information generation component 545 and the packet routing component 550. The apparatus of FIG. 5 can be combined with that of FIG. 3 in a single apparatus. One or more apparatuses of FIG. 3 can operate in combination with one or more apparatuses of FIG. 5 in a system configuration.

The network interface 520 can receive notifications of network status information in one or a plurality of forms. For example, as illustrated, the network interface can receive flooding status update messages 560a indicative of network events, almanac status update messages 560b indicative of (e.g. hourly based) network topology information constructed based on network events, network status updates 560c from terrestrial ground stations which monitor network conditions and transmit such update messages, or a combination thereof. The different updates 560a, 560b, 560c may be received in different time intervals and may cover different numbers of nodes or portions of the network. For example, update messages 560a can be transmitted at a frequency on the order of seconds or milliseconds, update messages 560b can be transmitted at a frequency on the order of minutes, and update messages 560c can be transmitted at a frequency on the order of hours. Network status update messages transmitted at different frequencies can cover different numbers of nodes. In some embodiments, the ground station can transmit, e.g. on an hourly basis, an indication of the entire current network topology and the status of links thereof.

The multi-zone/multi-precision network status information component 540 is configured to maintain network status information for a plurality of different portions (zones) of the network. Network status information for different portions of the network has different levels of precision. The multi-zone/multi-precision network status information component 540 maintains the network status information based on update messages received via the network interface 520. The maintenance can include tracking the availability of network nodes and network links based on update messages, for example by maintaining a link state database and updating the link state database in response to received update messages. Network status information can be maintained separately for each zone, or network status information can be maintained for all zones together. The multi-zone/multi-precision network status information component 540 may be responsible for maintaining a network topology graph or equivalent information, either for the network as a whole or for different portions of the network separately.

The routing information generation component 545 is configured to generate routing information based on said network status information maintained by the multi-zone/multi-precision network status information component 540, for the plurality of different portions of the network in combination. This can include generating shortest path trees specifying packet routing policies, building routing tables, etc. The routing information generation component can merge shortest path trees for multiple zones together. The routing information generation component can merge network topology graphs for multiple zones, and generate shortest path trees for multiple zones based on the merged network topology graphs.

The packet routing component 550 is configured to perform packet routing based on the current routing information. For example, a packet received via the network interface 520 specifying a destination can be handled by the packet routing component in order to route the packet to a next node based on the current routing information generated by routing information generation component 545. Packet routing can be performed in a variety of ways as would be readily understood by a worker skilled in the art. For example, the packet routing component can determine a next node to forward the packet to on its way to the destination, and cause the network interface 520 to forward the packet to the next node.

Figure 6:
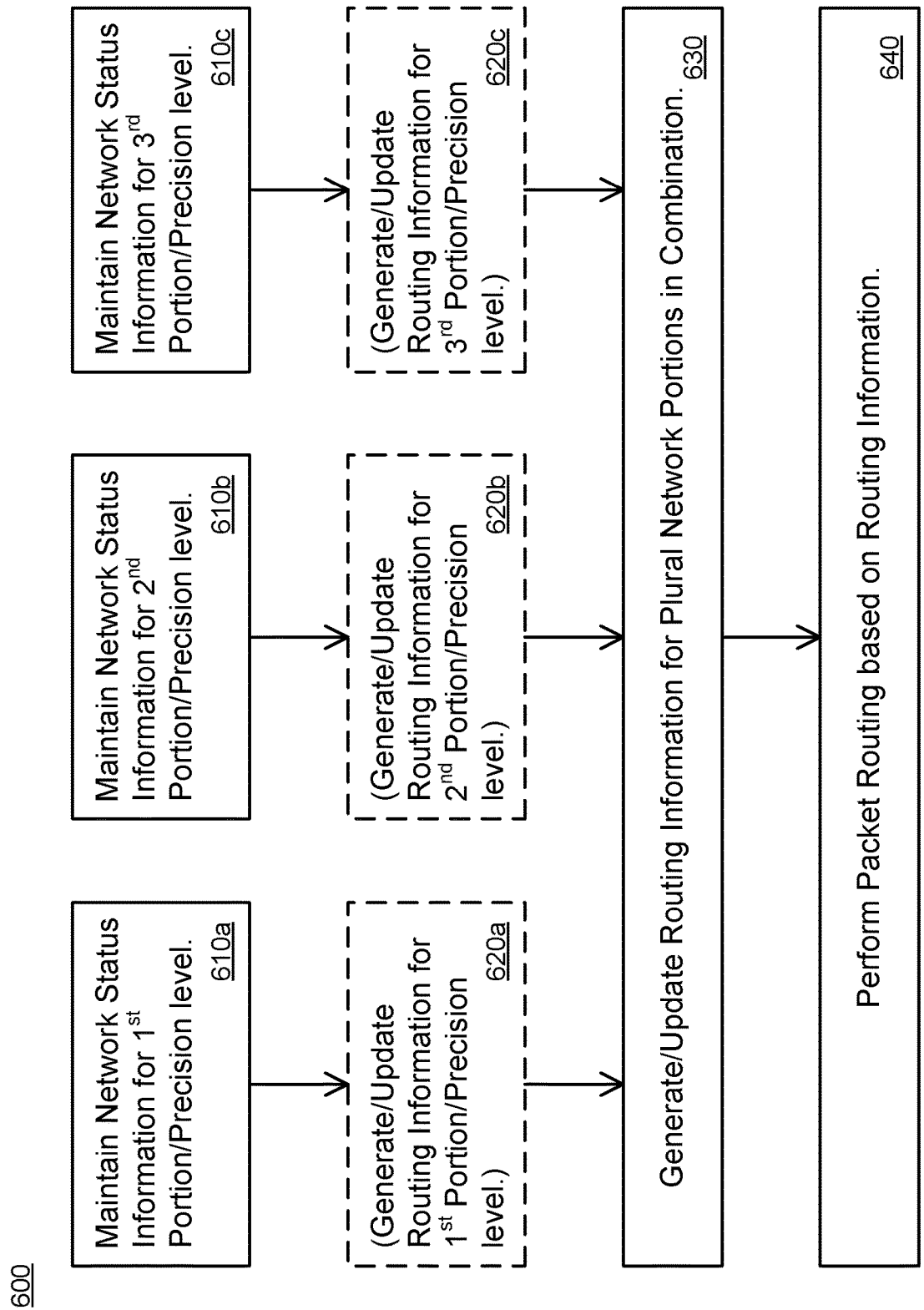
FIG. 6 illustrates an aspect of operation of the apparatus of FIG. 5, according to an embodiment of the present invention.

FIG. 6 illustrates operation 600 of the apparatus 500, according to an embodiment of the present invention. The operation includes maintaining 610a network status information for a first portion of the network, or alternatively for a first precision level. The operation further includes maintaining 610b network status information for a second portion of the network, or alternatively for a second precision level. The operation may further include maintaining 610c network status information for a third portion of the network, or alternatively for a third precision level. Additional network status information maintenance operations for additional network portions or precision levels may also be performed. In some embodiments, network status information for different network portions can be maintained by processing different types of network status update messages, with different latencies or levels of precision. Maintaining network status information for a particular portion of the network can include maintaining a network topology graph for that network portion, which is adjusted based on network status update messages.

FIG. 6 illustrates operations 620a, 620b, 620c, which can be included or excluded depending on the embodiment. These operations comprise generating or updating routing information for different respective portions of the network or precision levels. For example, operations 620a, 620b, 620c can include generating shortest path trees separately for different network portions, or generating routing tables separately for different network portions, or both.

FIG. 6 illustrates operation 630, which comprises generating or updating routing information for multiple portions of the network in combination. This can include combining the shortest path trees or other routing information as generated in operations 620a, 620b, and 620c. This can include generating shortest path trees, routing tables, or other routing information based on the network status information generated and maintained in operations 610a, 610b, and 610c. FIG. 6 further illustrates performing 640 packet routing based on the generated routing information.

Figure 7:
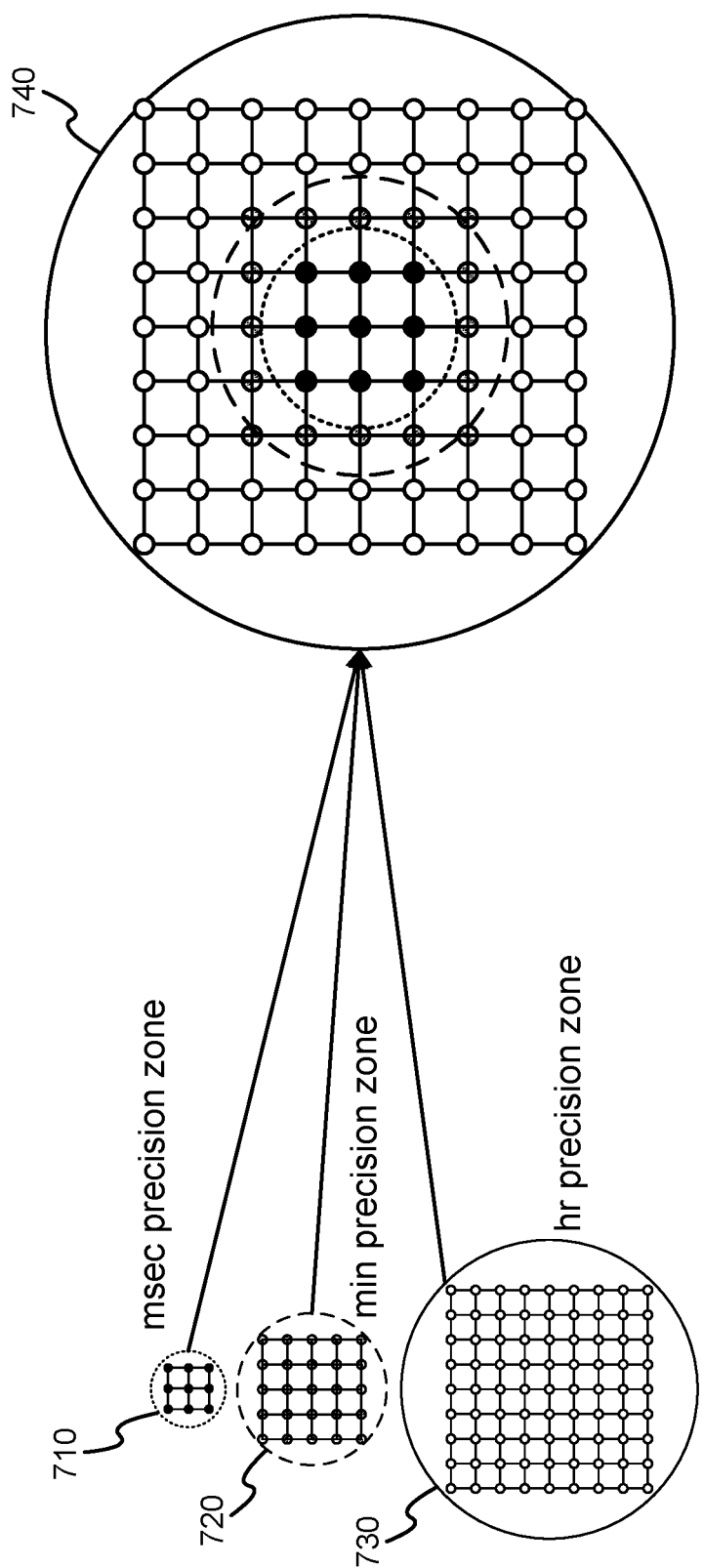
FIG. 7 illustrates a multiple degree of precision network topology graph according to an example embodiment of the present invention.

FIG. 7 illustrates a multiple degree of precision network topology graph 740 constructed by superimposing a first network topology graph 710, a second network topology graph 720 and a third network topology graph 730. Such a topology graph 740 can be constructed by each different network node based on network status information available to that network node. The first network topology graph 710 covers a first portion of the network and reflects the network status of this first portion to a high level of precision (e.g. update latency is on the order of milliseconds). The second network topology graph 720 covers a second portion of the network and reflects the network status of this second portion to an intermediate level of precision (e.g. update latency is on the order of minutes). The third network topology graph 730 covers a third portion of the network and reflects the network status of this third portion to a low level of precision (e.g. update latency is on the order of hours). The three different portions can cover the entire network. It is noted that, rather than superposition of graphs, the multiple degree of precision network topology graph can be generated as a union of overlapping or non-overlapping graphs, each having a different level of precision. Non-overlapping graphs can be generated from overlapping graphs by removing the overlapping parts from one of the graphs. The non-overlapping graphs can then be merged together. Accordingly, the network topology graphs can be combined, for example using one or more superposition operations, union operations, or a combination thereof.

In some embodiments, each portion of the network can be defined as the portion of the network falling within a particular distance of the network node which is maintaining these portions. As such, a given portion of the network can be thought of as a circular region centered at this network node. The topology graph 740 can then be thought of as a graph consisting of multiple concentric circular or ring-shaped regions, where circular or ring-shaped regions closer to the center correspond to higher levels of precision of network status information.

Figure 8:
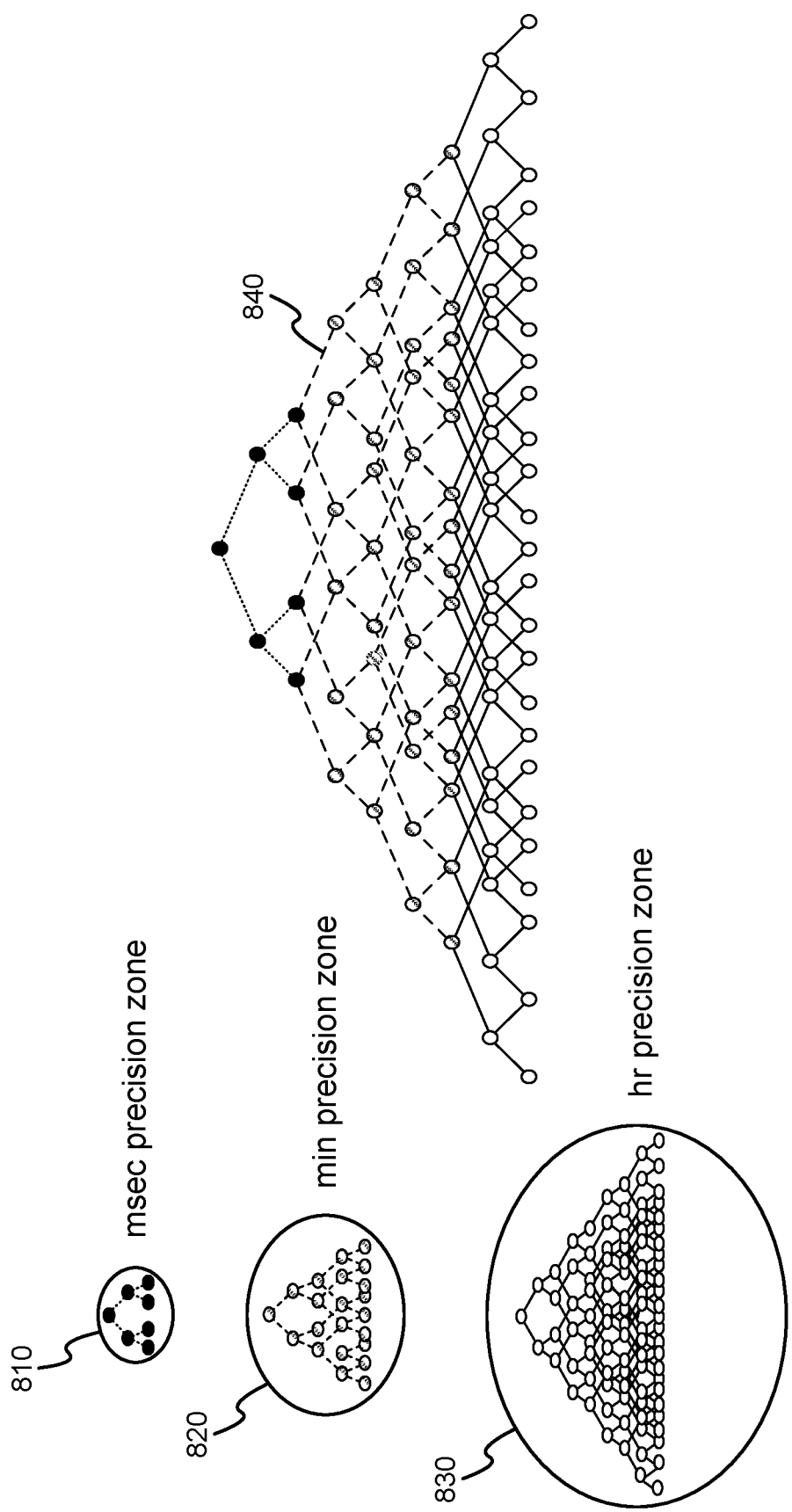
FIG. 8 illustrates a shortest path routing tree generated for the network topology graph of FIG. 7, according to an embodiment of the present invention.

FIG. 8 illustrates a shortest path tree 840 which is generated based on the multiple degree of precision topology graph 740. The shortest path tree 840 can be obtained for example by running Dijkstra's algorithm on the graph 740. The shortest path tree 840 will then also consist of different portions 810, 820, 830 having different levels of precision.

The shortest path tree 840 can alternatively be generated by separately generating a shortest path tree 810, 820, 830 for each of the topology graphs 710, 720, 730, and then combining these shortest path trees. Different ones of the shortest path trees 810, 820, 830 can be updated separately at different times. For example, one shortest path tree can be updated in response to a network status update. Once updated, the new shortest path tree can be integrated together with the other (non-updated) shortest path trees to create a shortest path tree for the entire network.

Figure 9:
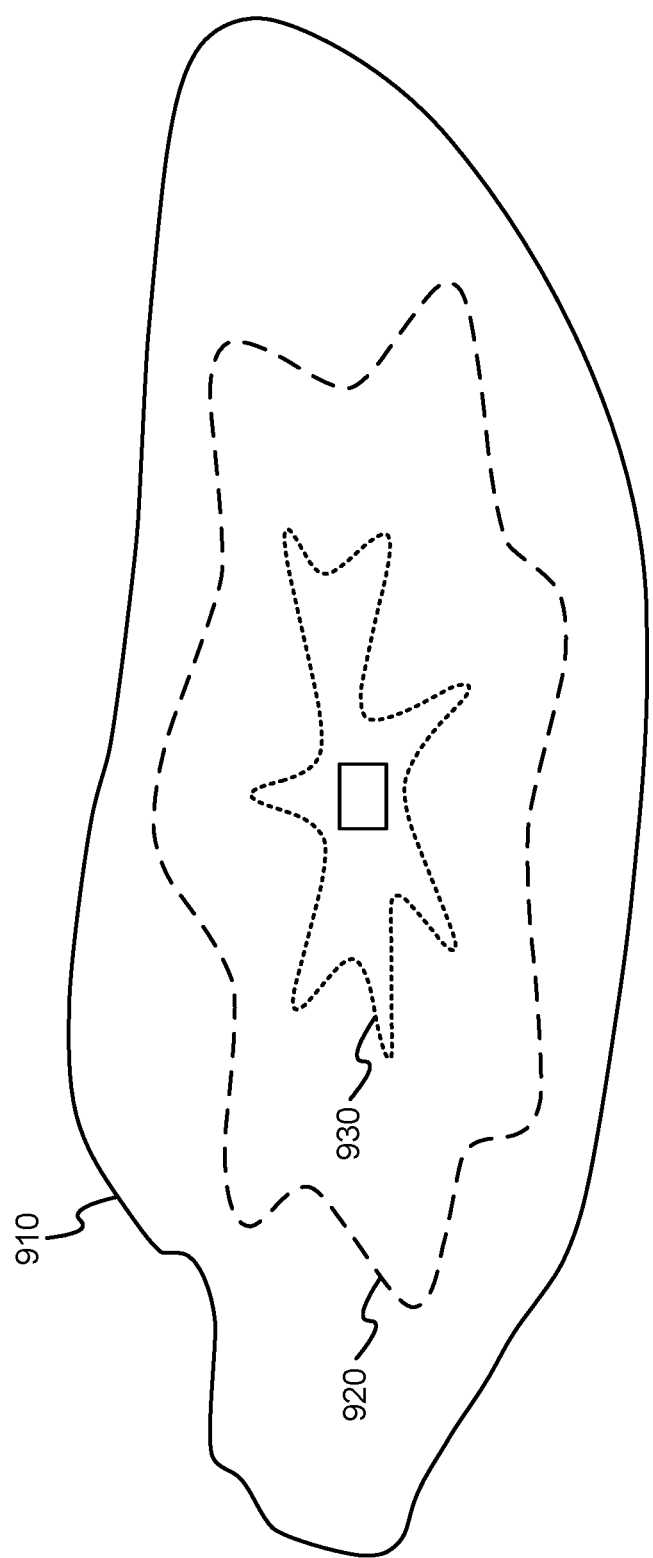
FIG. 9 illustrates a network having arbitrary region boundaries, according to an embodiment of the present invention.

As shown in FIG. 9, different portions 910, 920, 930 (respectively corresponding to topology graphs 710, 720, 730) of the network can have substantially arbitrary boundaries. That is, the boundaries do not have to be convex, symmetric, concentric, etc.

Figure 10:
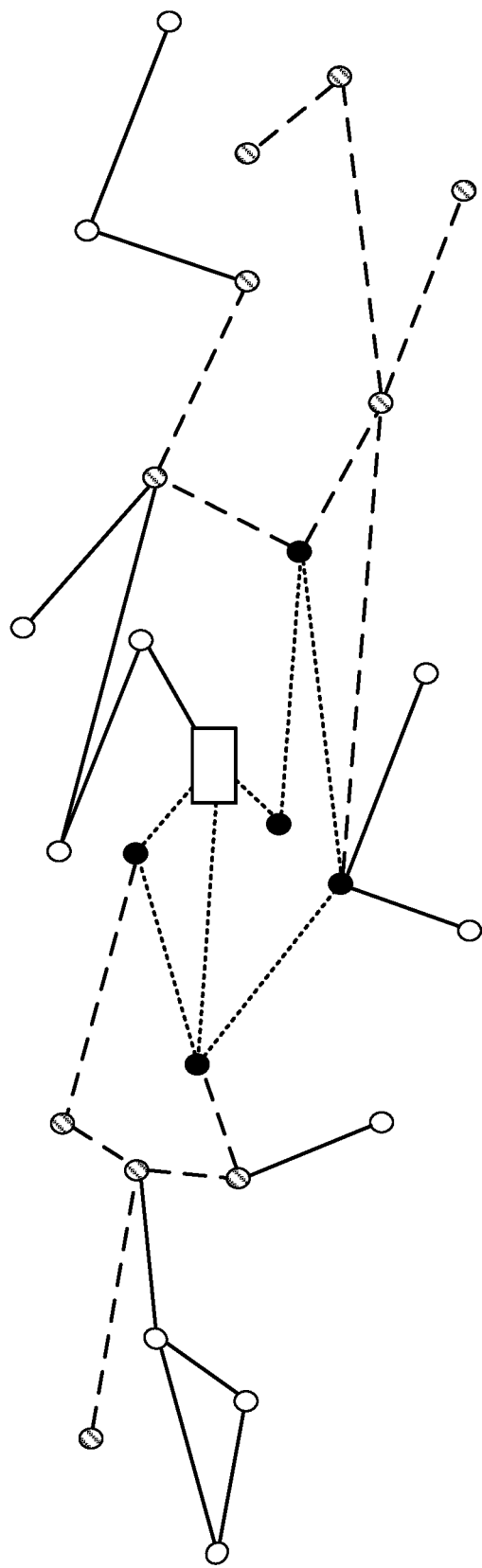
FIG. 10 illustrates a network having an arbitrary topology, according to an embodiment of the present invention.

As shown in FIG. 10, different portions of the network, or the entire network, do not need to be disposed in a grid formation. Rather, the network can have a substantially arbitrary topology.

Figure 11:
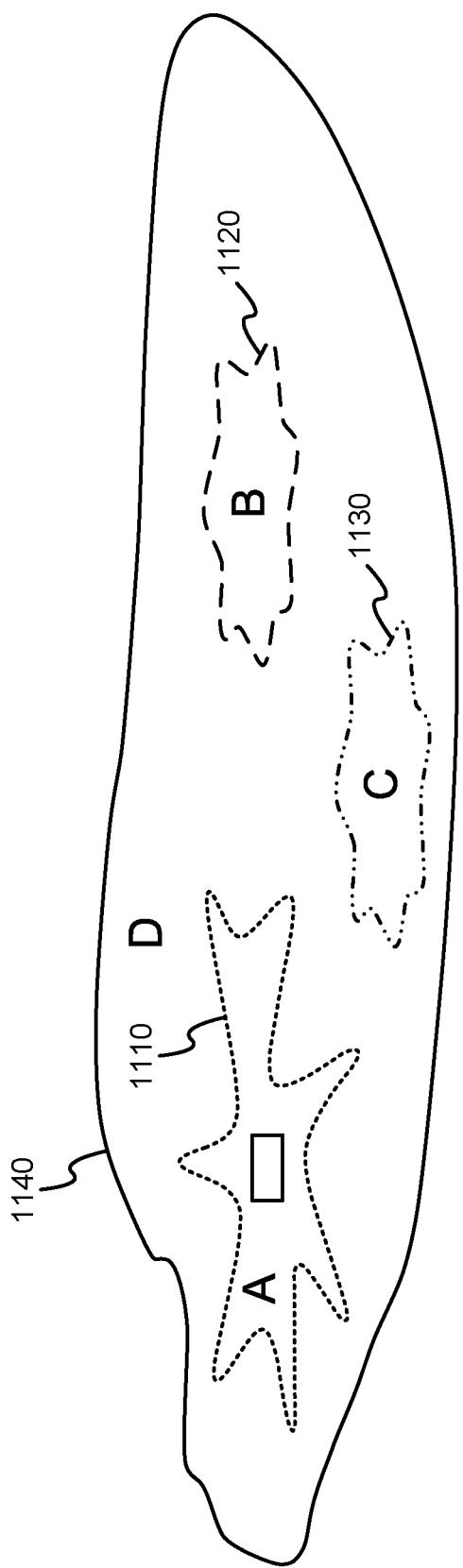
FIG. 11 illustrates a network having disjoint regions of higher precision network status information, according to an embodiment of the present invention.

As shown in FIG. 11, different portions of the network can be disjoint from one another. Furthermore, a given portion of the network can include different disjoint sub-portions. For example, regions A 1110, B 1120 and C 1130 can correspond to higher levels of precision than region D 1140, which encompasses all of regions A, B and C.

Figure 12:
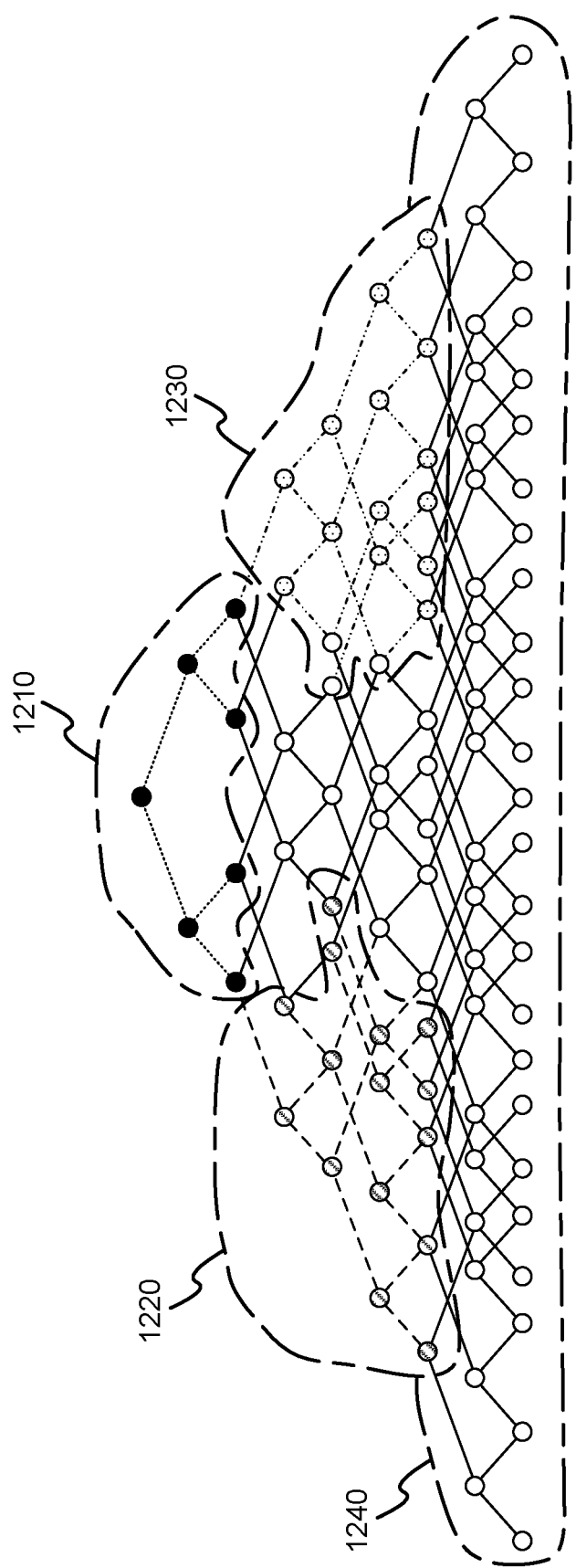
FIG. 12 illustrates a shortest path routing tree generated for the network topology graph of FIG. 11, according to an embodiment of the present invention.

In this case the resulting shortest path tree for the overall network will have different portions or pockets of branches with different precision levels. This is illustrated in FIG. 12. The region 1240 corresponds to the portion of the tree for region D 1140. The portion of the tree for region D can be based on lower-precision information, for example as advertised by hourly almanac updates. Each node may also have a local region 1210 in which network status information is maintained to high precision, for example by use of local flooding to rapidly communicate network status updates upon status changes (e.g. link failures). Each node may also have other regions 1220, 1230 where the network status information is maintained to a higher precision than the region 1240, but not necessarily to as high a precision as region 1210. Also in FIG. 12, it is noted that the shortest path tree starting at any given node can be formed by taking the portion of the shortest path tree of the overall network, beginning with that node as the root node.

Referring to FIGS. 11 and 12, if a link fails between almanac updates, only nodes in regions A, B and C can potentially be informed of this before the next almanac update. In an example embodiment, a link event between nodes in region D might not be seen by nodes in region A until the next almanac update. Updates for link events in other regions might not necessarily be seen by nodes in A, B, and C in a uniform manner. For example, nodes in region A may be notified of link events in regions B and C substantially immediately, but there may be a delay before nodes in region B are notified (e.g. via almanac update) of link events in regions A and C.

FIGS. 13A to 13I illustrate an example packet routing scenario from a source node S to a destination node D, in the case where only some nodes are currently informed of a failure of link L1. In particular, in each of FIGS. 13A to 13I, it is assumed (for simplicity) that each node is only informed (to a high degree of precision) of the status of links which are immediately connected to that node, in the sense that it is informed of failures of these links substantially immediately. Each node is informed (to a lower degree of precision) of the status of all other links, in the sense that it is informed of failures of these links after a delay. It is assumed that the nodes other than those connected to failed link L1 are not immediately informed that L1 has failed, at least at the time that the illustrated forwarding decisions are made.

Figure 13C:
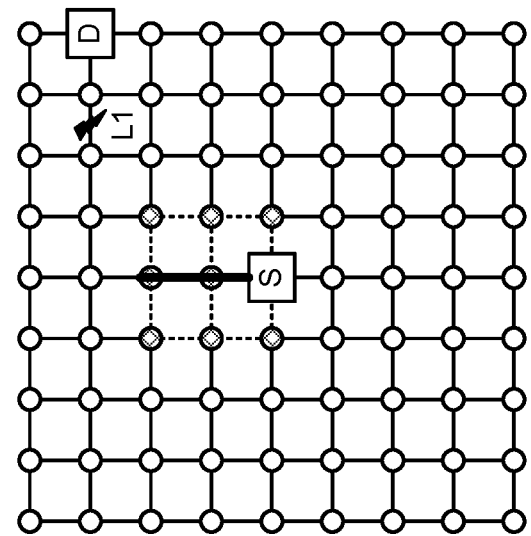
FIGS. 13A to 13I illustrate an example packet routing scenario from a source node S to a destination node D, according to an embodiment of the present invention.
Figure 13B:
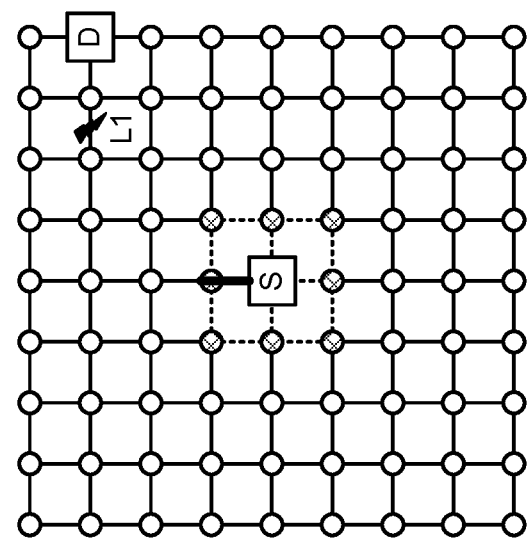
Figure 13A:
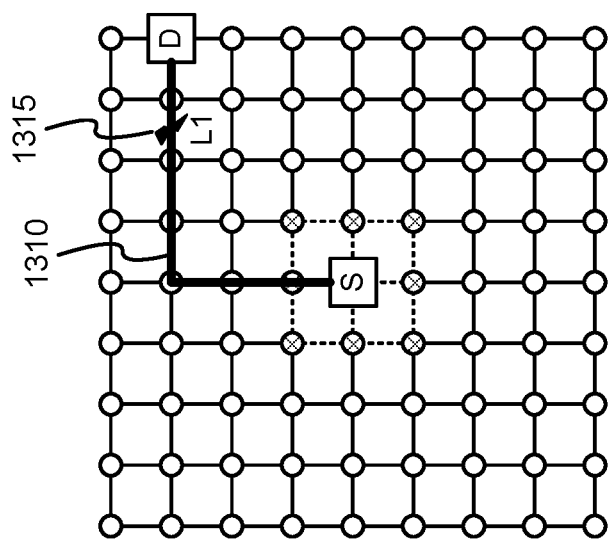
Figure 13D:
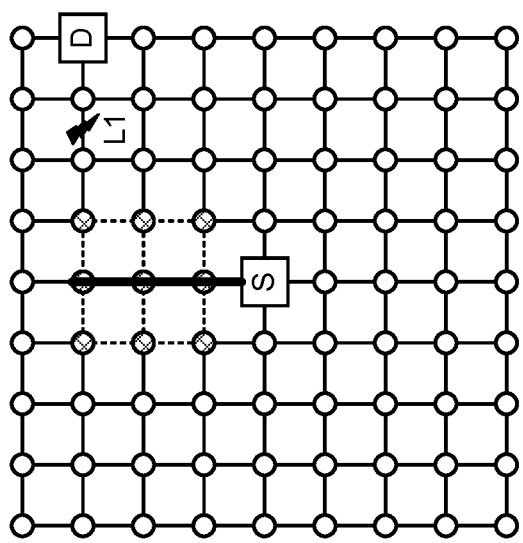
Figure 13E:
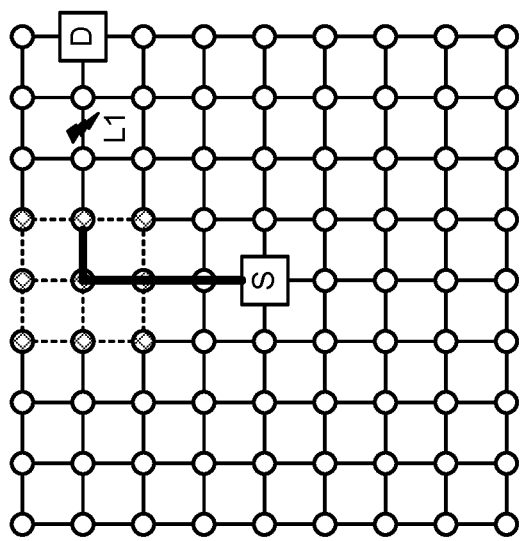
Figure 13F:
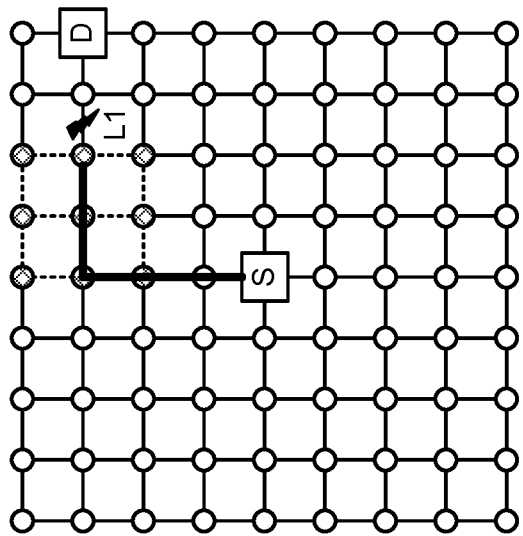
Figure 13I:
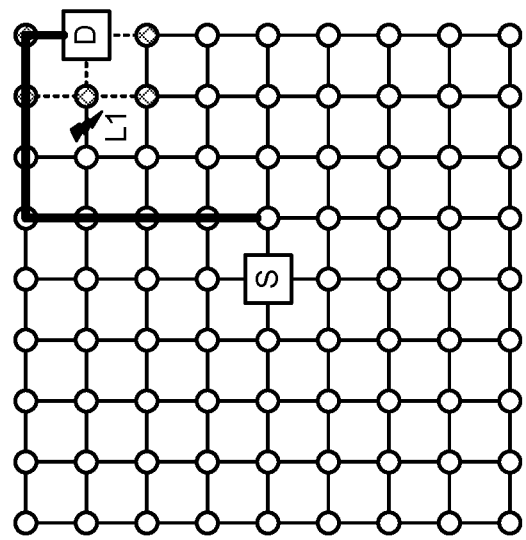
Figure 13H:
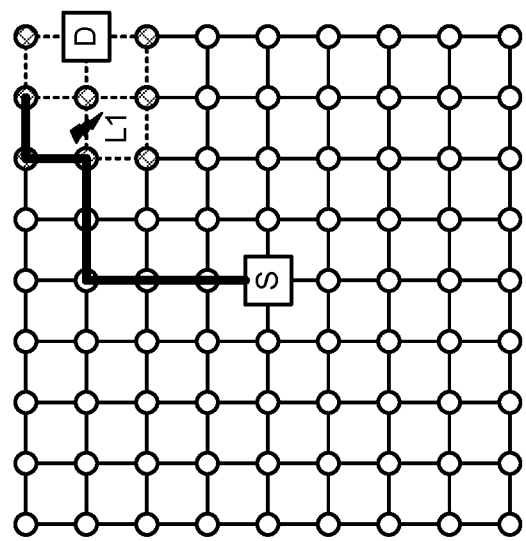

According to FIG. 13A, the source node S (being uninformed of failure 1315 of link L1) determines a path 1310 to the destination node D. The source node S passes the packet along to the next-hop node along this path. Next-hop nodes may determine the same path 1310 (e.g. independently) and forward the packet onward to a further next-hop node. This is illustrated in FIGS. 13B-13F.

Figure 13G:
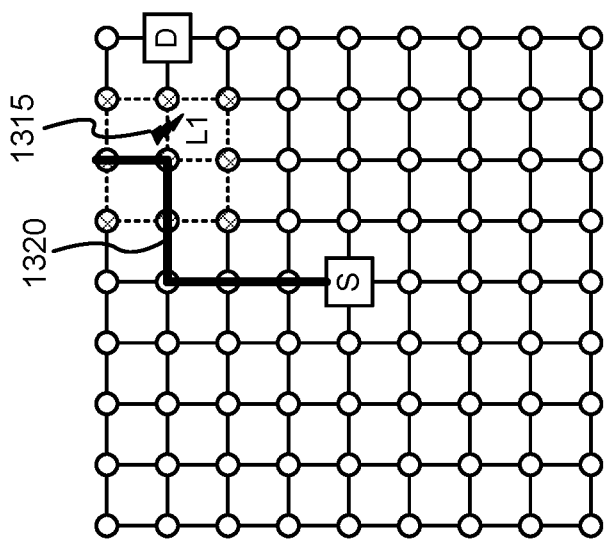

At FIG. 13G, the node 1320 currently in possession of the packet is aware of the failure 1315 of link L1. The node 1320 therefore chooses a different route for the packet and forwards the packet onward as shown in FIG. 13G toward the destination D. The nodes in FIGS. 13H and 13I handle the packet similarly. Therefore, even though various nodes are uninformed of the failure of link L1, the nodes closer to link L1 (including node 1320) are aware of this link failure, and take appropriate actions to route the packet around the failed link. The packet is routed successfully even in the case of imprecise knowledge of the network status. The routing is not necessarily optimal, however routing is still successful.

Embodiments of the present invention can potentially allow for the use of large flat topologies in network operations.

Embodiments of the present invention can be used with network nodes that each independently make routing or packet forwarding decisions, for example in a hop-by-hop manner. Embodiments of the present invention can be used with network nodes that use other means for making routing of packet forwarding decisions. For example, in some embodiments, source routing or segment routing can be used, in which one or more nodes make routing decisions which are communicated (e.g. in a packet header) to other nodes that subsequently receive the packet. These other nodes can implement the indicated routing decisions if possible, or override them with new routing decisions if necessary. Multiple nodes along a packet's path can perform source or segment routing and direct at least some subsequent nodes to implement the determined route.

Figure 14:
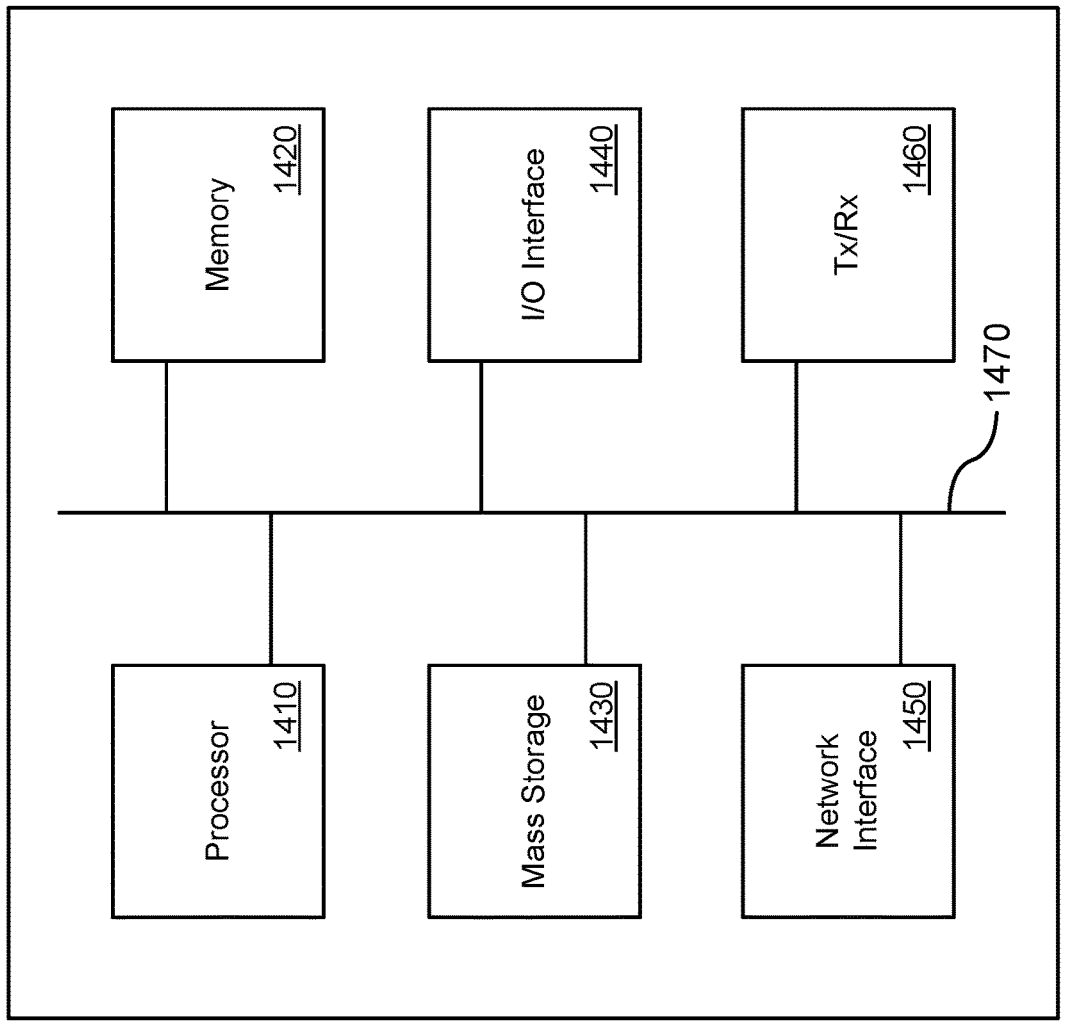
FIG. 14 is a schematic diagram of an electronic device that may perform any or all of operations of the above methods and features explicitly or implicitly described herein, according to different embodiments of the present invention.

FIG. 14 is a schematic diagram of an electronic device 1400 that may perform any or all of operations of the above methods and features explicitly or implicitly described herein, according to different embodiments of the present invention. For example, a computer equipped with network function may be configured as electronic device 1400.

As shown, the device includes a processor 1410, such as a Central Processing Unit (CPU) or specialized processors such as a Graphics Processing Unit (GPU) or other such processor unit, memory 1420, non-transitory mass storage 1430, I/O interface 1440, network interface 1450, and a transceiver 1460, all of which are communicatively coupled via bi-directional bus 1470. According to certain embodiments, any or all of the depicted elements may be utilized, or only a subset of the elements. Further, the device 1400 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 1420 may include any type of non-transitory memory such as static random access memory (SRAM), dynamic random access memory (DRAM), synchronous DRAM (SDRAM), read-only memory (ROM), any combination of such, or the like. The mass storage element 1430 may include any type of non-transitory storage device, such as a solid state drive, hard disk drive, a magnetic disk drive, an optical disk drive, USB drive, or any computer program product configured to store data and machine executable program code. According to certain embodiments, the memory 1420 or mass storage 1430 may have recorded thereon statements and instructions executable by the processor 1410 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for managing a link state database in a network, comprising, by a network node of a communication network with dynamically changing topology:
   maintaining network status information for a plurality of different portions of the network, each of said different portions defined by a different respective set of network nodes and links, wherein said network status information for one of the different portions is updated with a higher latency than said network status information for another one of the different portions, said higher latency being due at least in part to active inhibition of notifications indicative of the network status information by one or more other network nodes; and
   updating the link state database based on the network status information for the plurality of different portions of the network, the link state database indicative of link states within the plurality of different portions of the network, wherein the link state database includes a first portion indicative of link states for said one of the different portions of the network and a second portion indicative of link states for said other one of the different portions of the network, and an indication that the first portion is tracked with a lower precision than the second portion due to said higher latency.

2. The method of claim 1, wherein updating the link state database comprises updating the link state database separately for a given portion of the plurality of different portions of the network, in response to receiving one of said notifications indicative of the network status information for said one of the plurality of different portions.

3. The method of claim 2, further comprising, following said updating the link state database for said given portion, generating routing information for said given portion, the routing information indicating desired routing paths through said given portion to reach specified nodes of the network within said given portion, and integrating said routing information with routing information for other ones of the plurality of different portions to generate routing information for the network.

4. The method of claim 1, wherein the higher latency corresponds to a time between an occurrence of a network event and the network node being notified of the network event, said active inhibition including one or more of: notification mechanism selecting actions, notification inhibiting actions, and notification delaying actions, performed by one or more network nodes handling the notifications.

5. The method of claim 1, further comprising generating routing information based on contents of said link state database, wherein generating the routing information comprises generating an indication of where to route the packet based on a specified destination of the packet, the specified destination falling within or reachable by a node within one of the different portions of the network, the routing information reflecting a plurality of different levels of precision of link state information corresponding to the plurality of different portions of the network.

6. The method of claim 1, further comprising generating routing information based on contents of said link state database, wherein generating the routing information comprises combining multiple topology graphs, each topology graph indicating available nodes of the network and available links between said available nodes, each topology graph corresponding to a different one of said different portions of the network, said different portions being overlapping, non-overlapping, or a combination thereof.

7. The method of claim 6, wherein generating the routing information further comprises generating a tree having sufficient path performance based on the combined topology graphs, the tree having sufficient path performance indicating desired routing paths through the network to reach different nodes of the network.

8. The method of claim 1, further comprising generating routing information based on contents of said link state database, wherein generating the routing information comprises:

generating or obtaining multiple topology graphs, each topology graph indicating available nodes of the network and available links between said available nodes, each topology graph corresponding to a different one of said different portions of the network, said different portions being overlapping, non-overlapping, or a combination thereof;

generating multiple trees having sufficient path performance each based on a different one of the multiple topology graphs, each tree having sufficient path performance indicating desired routing paths through the network to reach different nodes of the network; and combining the trees having sufficient path performance to define an overall tree having sufficient path performance for the network.

9. The method of claim 1, further comprising updating routing information based on contents of said link state database in response to receipt of network status information for one of the different portions, wherein generating the routing information comprises:

computing, for said one of the different portions separately from other ones of the different portions, a tree indicating desired routing paths through said one of the different portions; and integrating the tree with other trees for said other ones of the different portions to create a tree indicating desired routing paths through the network.

10. The method of claim 1, further comprising generating routing information based on contents of said link state database, wherein generating the routing information comprises combining network status information for different ones of the plurality of different portions of the network, said different portions being overlapping, non-overlapping, or a combination thereof.

11. A method for managing information in a network, comprising, by a network node of a communication network with dynamically changing topology:

generating or receiving an indication of a network event, the network event pertaining to status of a node or link of the network;

transmitting the indication of the network event toward a first one or more other network nodes to notify the first one or more other network nodes of a change in network status with a first level of precision; and actively inhibiting transmission of the indication of the network event toward a second one or more other network nodes to notify the second one or more other network nodes of the change in network status with a second level of precision lower than the first level of precision, such that transmission of the indication of the network event toward the second one or more network nodes is delayed compared to transmission of the indication of the network event toward the first one or more network nodes.

12. The method of claim 11, wherein inhibiting transmission of the indication of the network event toward a second one or more other network nodes comprises delaying transmission of the indication by holding the indication and transmitting the indication toward the second one or more other network nodes after a predetermined time period, or causing the transmission to be forwarded by an alternative and higher-latency mechanism.

13. A network node comprising a network interface, a processor and a non-transitory memory, the network node belonging to a communication network with dynamically changing topology and configured to:

maintain, using the processor and the memory, network status information for a plurality of different portions of the network, each of said different portions defined by a different respective set of network nodes and links, wherein said network status information for one of the different portions is updated with a higher latency than said network status information for another one of the different portions;

update the link state database based on the network status information for the plurality of different portions of the network, the link state database indicative of link states within the plurality of different portions of the network, wherein the link state database includes a first portion indicative of link states for said one of the different portions of the network and a second portion indicative of link states for said other one of the different portions of the network, and an indication that the first portion is tracked with a lower precision than the second portion due to said higher latency; and actively inhibiting transmission of an update to said network status information toward one or more other network nodes.

14. The network node of claim 13, wherein updating the link state database comprises updating the link state database separately for a given portion of the plurality of different portions of the network, in response to receiving one of said notifications indicative of the network status information for said one of the plurality of different portions.

15. The network node of claim 14, further configured, following said updating the link state database for said given portion, to generate routing information for said given portion, the routing information indicating desired routing paths through said given portion to reach specified nodes of the network within said given portion, and to integrate said routing information with routing information for other ones of the plurality of different portions to generate routing information for the network.

16. The network node of claim 13, wherein the higher latency is due at least in part to active inhibition of notifications indicative of the network status information by one or more other network nodes and corresponds to a time i-s between an occurrence of a network event and the network node being notified of the network event, said active inhibition including one or more of: notification mechanism selecting actions, notification inhibiting actions, and notification delaying actions, performed by one or more network nodes handling the network status information.

17. The network node of claim 13, further configured to generate routing information based on contents of said link state database, wherein generating the routing information comprises combining multiple topology graphs, each topology graph indicating available nodes of the network and available links between said available nodes, each topology graph corresponding to a different one of said different portions of the network, said different portions being overlapping, non-overlapping, or a combination thereof.

18. The network node of claim 13, wherein the notifications include one or more of: a notification indicative of a single network event; a notification indicative of multiple network events; a notification indicative of overall status of a portion of the network; a notification received via another peer network node; and a notification transmitted to the network node from a ground station when the network node is a satellite network node.

19. A network node comprising a network interface and a processor, the network node belonging to a communication network with dynamically changing topology and configured to:

receive, via the network interface, an indication of a network event, or generate the indication of the network event, the network event pertaining to status of a node or link of the network;

transmit, using the network interface, the indication of the network event toward a first one or more other network nodes to notify the first one or more other network nodes of a change in network status with a first level of precision; and actively inhibit transmission of the indication of the network event toward a second one or more other network nodes to notify the second one or more other network nodes of the change in network status with a second level of precision lower than the first level of precision, such that transmission of the indication of the network event toward the second one or more network nodes is delayed compared to transmission of the indication of the network event toward the first one or more network nodes.

20. The network node of claim 19, wherein inhibiting transmission of the indication of the network event toward a second one or more other network nodes comprises delaying transmission of the indication, blocking transmission of the indication, or causing the transmission to be forwarded by an alternative mechanism.

21. A system for managing a link state database in a communication network with dynamically changing topology, the system comprising:

a first network node configured to:

receive or generate an indication of a network event, the network event pertaining to status of a node or link of the network;

transmit, using the network interface, the indication of the network event toward a first one or more other network nodes to notify the first one or more other network nodes of a change in network status with a first level of precision; and actively inhibit transmission of the indication of the network event toward a second one or more other network nodes to notify the second one or more other network nodes of the change in network status with a second level of precision lower than the first level of precision, such that transmission of the indication of the network event toward the second one or more network nodes is delayed compared to transmission of the indication of the network event toward the first one or more network nodes; and a second network node configured to:

receive the indication of the network event from the first network node, or via another path or mechanism not involving the first network node, upon the first network node inhibiting transmission of the indication of the network event; and maintain, based at least in part on the indication of the network event, network status information for a plurality of different portions of the network each of said different portions defined by a different respective set of network nodes and links.

22. The method of claim 11, wherein said first one or more other network nodes and said second one or more other network nodes are defined based on an origin of the indication, a location of the network event, an indication of distance travelled by the indication, or a combination thereof.

23. The method of claim 11, wherein inhibiting transmission of the indication of the network event toward a second one or more other network nodes comprises blocking transmission of the indication while allowing a later transmission of the indication, or delaying the transmission by a predetermined amount of time.

* * * * *